(12) United States Patent
Khan et al.

(10) Patent No.: US 9,385,778 B2
(45) Date of Patent: Jul. 5, 2016

(54) LOW-POWER CIRCUIT AND IMPLEMENTATION FOR DESPREADING ON A CONFIGURABLE PROCESSOR DATAPATH

(71) Applicant: QUALCOMM Incorporated, San Diego, CA (US)

(72) Inventors: Raheel Khan, Tustin, CA (US); Gayatri Singaravelu, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 188 days.

(21) Appl. No.: 14/170,274

(22) Filed: Jan. 31, 2014

(65) Prior Publication Data

US 2015/0222323 A1   Aug. 6, 2015

(51) Int. Cl.
| | |
|---|---|
| H04B 1/00 | (2006.01) |
| H04B 1/7115 | (2011.01) |
| H04B 1/7083 | (2011.01) |
| H04B 1/7117 | (2011.01) |
| H04B 1/707 | (2011.01) |
| H04B 1/708 | (2011.01) |

(52) U.S. Cl.
CPC .............. *H04B 1/7115* (2013.01); *H04B 1/707* (2013.01); *H04B 1/708* (2013.01); *H04B 1/7083* (2013.01); *H04B 1/7117* (2013.01)

(58) Field of Classification Search
CPC . H04J 11/0069; H04L 5/0048; H04L 27/2655
See application file for complete search history.

(56) References Cited

U.S. PATENT DOCUMENTS

| | | | |
|---|---|---|---|
| 6,717,930 B1* | 4/2004 | Sezgin et al. | 370/335 |
| 6,741,578 B1* | 5/2004 | Moon et al. | 370/335 |
| 8,155,087 B2 | 4/2012 | Shibata | |
| 2002/0034944 A1* | 3/2002 | Tanno et al. | 455/434 |
| 2004/0028013 A1* | 2/2004 | Fitton et al. | 370/335 |
| 2004/0062298 A1 | 4/2004 | McDonough et al. | |
| 2005/0088987 A1* | 4/2005 | Ryu | 370/328 |
| 2005/0147157 A1* | 7/2005 | Chen et al. | 375/150 |
| 2006/0098726 A1 | 5/2006 | Pan et al. | |
| 2006/0233139 A1* | 10/2006 | Kuo | 370/335 |
| 2007/0025424 A1* | 2/2007 | Hahm et al. | 375/144 |

(Continued)

FOREIGN PATENT DOCUMENTS

| | | |
|---|---|---|
| EP | 0661831 A2 | 7/1995 |
| EP | 0984577 B1 | 12/2004 |

(Continued)

OTHER PUBLICATIONS

International Search Report and Written Opinion—PCT/US2015/013341—ISA/EPO—May 4, 2015.

*Primary Examiner* — Shuwang Liu
*Assistant Examiner* — Sung Ahn
(74) *Attorney, Agent, or Firm* — Loza & Loza LLP

(57) ABSTRACT

Systems and methods for despreading a received signal are described herein. In one embodiment, a vector processor comprises a plurality of code generators, wherein each code generator is configured to generate a different code corresponding to a different code hypothesis. The vector processor also comprises a plurality of despread blocks coupled to a common input for receiving samples of a signal, wherein each despread block is configured to despread at least a portion of the samples with a different one of the codes to generate respective despreaded samples and to accumulate the respective despreaded samples over a length of the code.

22 Claims, 16 Drawing Sheets

(56) References Cited

U.S. PATENT DOCUMENTS

| | | | |
|---|---|---|---|
| 2007/0041348 A1* | 2/2007 | Kwun et al. | 370/335 |
| 2007/0133390 A1* | 6/2007 | Luo et al. | 370/208 |
| 2009/0257411 A1 | 10/2009 | Shitara | |
| 2010/0020901 A1* | 1/2010 | Park et al. | 375/299 |
| 2010/0061306 A1* | 3/2010 | Ryu et al. | 370/328 |
| 2010/0098031 A1* | 4/2010 | Charbit | 370/336 |

FOREIGN PATENT DOCUMENTS

| | | |
|---|---|---|
| EP | 1734377 A1 | 12/2006 |
| WO | 02091611 A1 | 11/2002 |

* cited by examiner

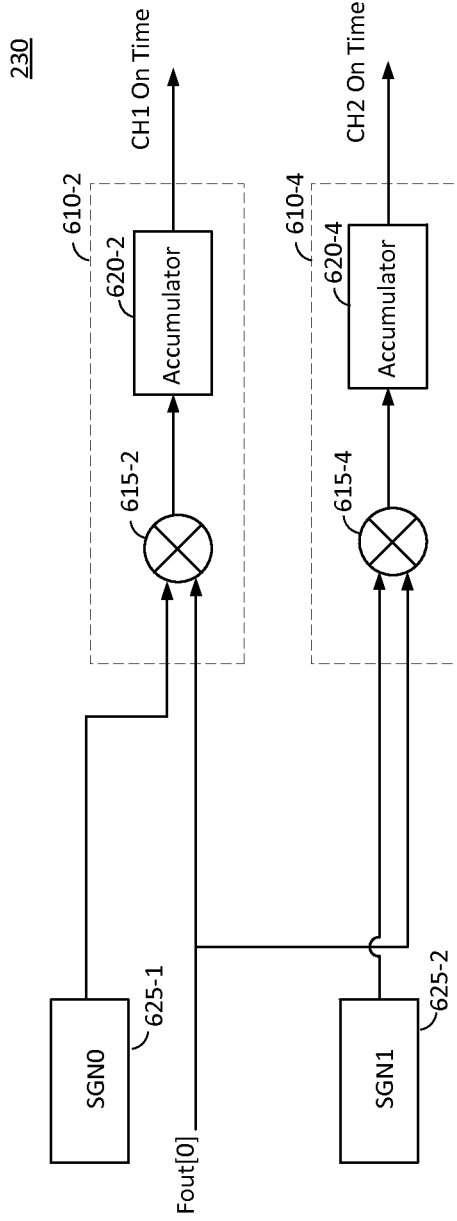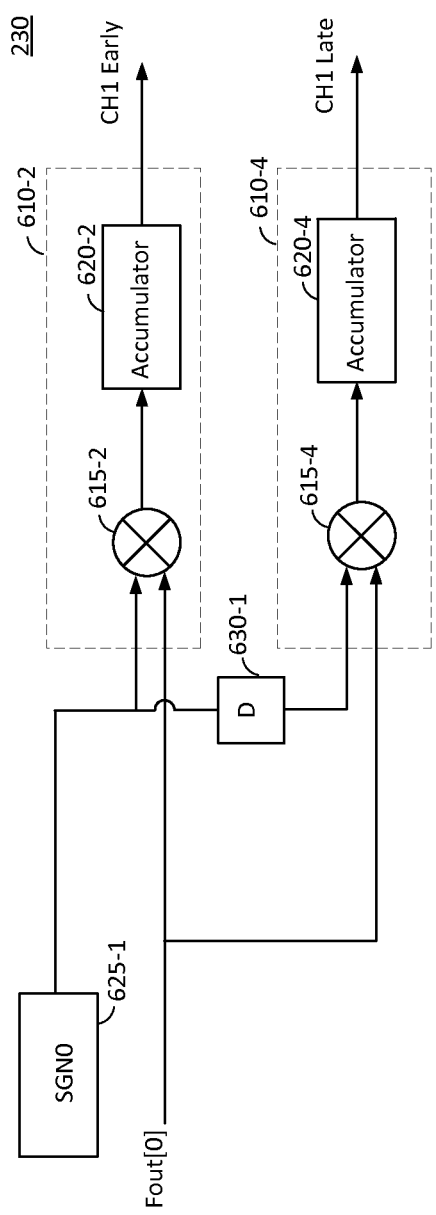
FIG. 6B
FIG. 6C ns,778 B2

LOW-POWER CIRCUIT AND IMPLEMENTATION FOR DESPREADING ON A CONFIGURABLE PROCESSOR DATAPATH

BACKGROUND

1. Field

Aspects of the present disclosure relate generally to signal processing, and more particularly, to despreading.

2. Background

A vector processor may be used to accelerate processing of baseband signals (e.g., in a wireless device) by performing arithmetic and logic operations on data vectors, in which each data vector comprises a set of data samples. A vector processor may comprise reconfigurable data paths, logic and arithmetic devices (e.g., adders, multiplexers, accumulators, etc.) that can be programmed to perform various vector operations on data vectors.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

According to an aspect, a vector processor is described herein. The vector processor comprises a plurality of code generators, wherein each code generator is configured to generate a different code corresponding to a different code hypothesis. The vector processor also comprises a plurality of despread blocks coupled to a common input for receiving samples of a signal, wherein each despread block is configured to despread at least a portion of the samples with a different one of the codes to generate respective despreaded samples and to accumulate the respective despreaded samples over a length of the code.

A second aspect relates to a vector processor. The vector processor comprises a plurality of code generators, wherein each code generator is configured to generate a different code corresponding to a different code hypothesis. The vector processor also comprises a plurality of delay elements coupled in series, wherein the delay elements are configured to shift the code generated by one of the code generators by different time delays to generate a plurality of time-shifted codes, each time-shifted code corresponding to a different time hypothesis. The vector processor further comprises a plurality of despread blocks coupled to a common input for receiving first and second samples of a signal, wherein, in a time-searching mode, each despread block is configured to despread at least a portion of the first samples with a different one of the time-shifted codes, and, in a code-searching mode, each despread block is configured to despread at least a portion of the second samples with a different one of the codes generated by the code generators.

A third aspect relates to a method of signal searching. The method comprises receiving samples of a signal, and generating a plurality of different codes, each code corresponding to a different code hypothesis. The method also comprises despreading at least a portion of the samples with the codes in parallel to generate despreaded samples for each code, and accumulating the despreaded samples for each code over a length of the code.

A fourth aspect relates to an apparatus for signal searching. The apparatus comprises means for receiving samples of a signal, and means for generating a plurality of different codes, each code corresponding to a different code hypothesis. The apparatus also comprises means for despreading at least a portion of the samples with the codes in parallel to generate despreaded samples for each code, and means for accumulating the despreaded samples for each code over a length of the code.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

BRIEF DESCRIPTION OF THE DRAWINGS

FIG. 6B shows an example of the despread circuit configured to process the output of the eight-tap FIR filter to generate on-time symbols for two channels according to an embodiment of the present disclosure.

FIG. 6C shows an example of the despread circuit configured to process the output of the eight-tap FIR filter to generate early and late symbols for a channel according to an embodiment of the present disclosure.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
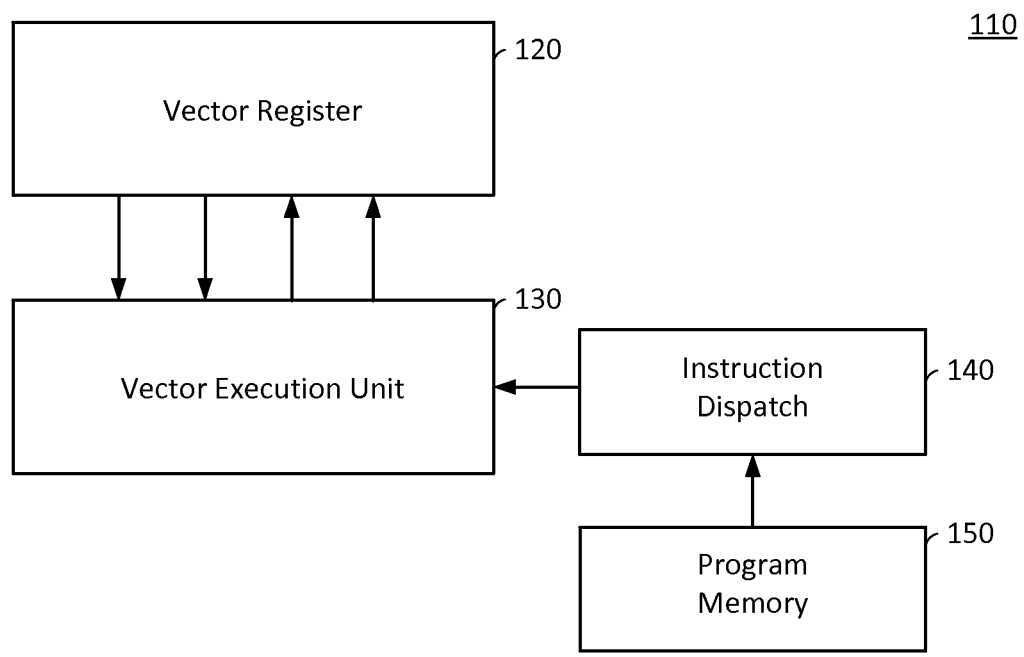
FIG. 1 is a block diagram of a vector processor.

A vector processor may be used to accelerate processing of baseband signals by performing arithmetic and logic operations on data vectors, in which each data vector comprises a set of data samples. FIG. 1 shows an example of a vector processor 110 comprising a vector register 120, a vector execution unit 130, an instruction dispatch circuit 140, and program memory 150. The vector execution unit 130 comprises reconfigurable data paths, logic and arithmetic devices (e.g., adders, multiplexers, accumulators) that can be configured (programmed) to perform various vector operations on data vectors.

During operation, data vectors that need to be processed by the vector processor 110 are loaded into the vector register 120. The instruction dispatch circuit 140 fetches one or more instructions from the program memory 150 and loads the instructions into the vector execution unit 130 to program the vector execution unit 130 to perform one or more vector operations. The vector execution unit 130 then reads a data vector from the vector register 120 and performs the vector operations on the data vector. The vector execution unit 130 may store the results of the vector operations in the vector register 120.

The vector processor 110 may be used to perform rake-receiver operations to process multipath signals. Multipath signals occur when a signal from a transmitter propagates to a receiver along multiple paths due to dispersion and reflection. This results in multiple versions of the signal (multipath signals) arriving at the receiver at different times. To process the multipath signals, the rake-receiver operations comprise multiple rake-finger operations, in which each rake-finger operation processes one of the multipath signals.

A rake-finger operation may comprise a rotation operation, a finite impulse response (FIR) filter operation, and a despread operation. Before the rake-finger operation is performed, the received signal is converted into samples by an analog-to-digital converter (ADC) (e.g., sampled at twice the chip rate of the signal). The rotation operation rotates the phases of the samples to compensate for carrier frequency offset between the transmitter and the receiver. The FIR filter operation determines sample values that are a fractional chip period offset from the sampling time of the ADC to generate samples that are aligned with the arrival time of a particular multipath signal. The despread operation despreads the filtered samples into symbols. The symbols from the different rake-finger operations may be combined, e.g., using maximal ratio combining, to obtain combined symbols for further processing (e.g, demodulation, decoding, etc.). Combining the symbols from the different rake-finger operations increases the energy of the symbols, thereby improving performance.

Currently, a vector processor 110 requires multiple instructions to perform a rake-finger operation. More particularly, separate instructions are required to perform the rotation operation, the FIR filter operation, and the despread operation. To perform the rake-finger operation, the instruction for the rotation operation is loaded into the vector execution unit 130 to configure the vector execution unit 130 to perform the rotation operation. The vector execution unit 130 reads samples from the vector register 120, performs the rotation operation on the samples, and writes the rotated samples to the vector register 120. The instruction for the FIR filter operation is then loaded into the vector execution unit 130 to configure the vector execution unit 130 to perform the FIR filter operation. The vector execution unit 130 reads the rotated samples from the vector register 120, performs the FIR filter operation on the samples, and writes the filtered samples to the vector register 120. The instruction for the despread operation is then loaded into the vector execution unit 130 to configure the vector execution unit 130 to perform the despread operation. The vector execution unit 130 reads the filtered samples from the vector register 120, performs the despread operation on the samples, and writes the despread samples to the vector register 120.

A drawback of this approach is that it requires separate instructions for the rotation operation, the FIR filter operation, and the despread operation. Further, the execution of each instruction involves reading samples from the vector register 120, performing the corresponding operation on the samples, and writing the processed samples back to the vector register 120 for the next instruction. This increases the number of clock cycles needed to perform rake-finger processing, and increases power consumption.

Embodiments of the present disclosure provide systems and methods for programming (configuring) a vector execution unit 130 to perform the rotation operation, the FIR filter operation, and the despread operation in a single instruction, thereby significantly reducing the number of clock cycles needed to perform rake-finger processing, and reducing power consumption. In this regard, FIG. 2 shows a rake-finger circuit 205 that may be implemented in the vector execution unit 130 according to various embodiments of the present disclosure, as discussed in further below.

In one aspect, the vector processor 110 may be implemented in a user equipment (UE) (e.g., a mobile wireless device). In this aspect, the UE may comprise a receiver circuit that receives a signal (e.g., from a base station) via one or more antennas. The signal may be received over one or more paths, and may be spread with one or more codes (e.g., pseudo random (PN) sequence, orthogonal code, etc.). The receiver circuit processes (e.g., filters, amplifies, digitizes, etc.) the received signal into samples. For example, the receiver circuit may sample the received signal at twice the chip rate of a code used to spread the signal. In this example, the samples are spaced half a chip apart. Each sample may be complex with in-phase (I) and quadrature (Q) components, and may comprise multiple bits. The samples may be temporarily stored in a local memory (LMEM), and loaded from the LMEM into the vector register 120 for processing by the vector processor 110, as discussed further below.

Figure 2:
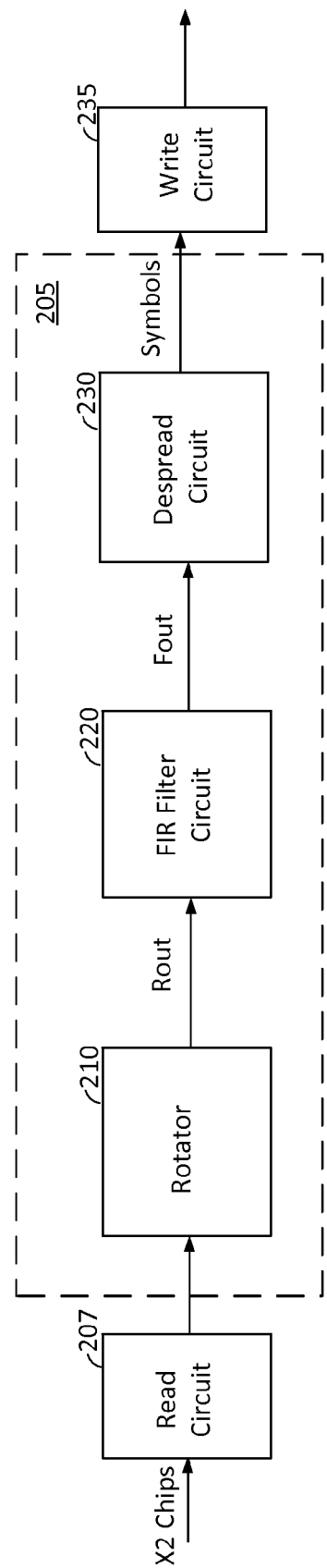
FIG. 2 shows a rake-finger circuit that may be implemented in the vector processor according to an embodiment of the present disclosure.

Referring to FIG. 2, the rake-finger circuit 205 comprises a rotator 210, an FIR filter circuit 220, and a despread circuit 230. In operation, a read circuit 207 retrieves samples of the received signal from the vector register 120, and inputs the samples to the rotator 210. The rotator 210 rotates the phases of the samples to compensate for carrier frequency offset between the transmitter and the receiver (e.g., a base station and a UE). The carrier frequency offset may be due to, e.g., a frequency offset between an oscillator used to generate the carrier frequency at the transmitter and an oscillator used to generate the carrier frequency at the receiver.

The FIR filter circuit 220 receives the resulting rotated samples (denoted Rout) from the rotator 210, and determines sample values that are a fractional chip period offset from the sampling time of the ADC used to generate the samples. The FIR filter circuit 220 does this through interpolation, in which each filter output sample is generated by multiplying each one of a plurality of rotated samples (e.g., four or eight rotated samples) by a respective filter coefficient and summing the resulting products.

The despread circuit 230 receives the output samples (denoted Fout) from the FIR filter circuit 220, and despreads the samples using one or more codes. For each code, the despread circuit 230 may accumulate the despreaded samples for the code over the length of the code (e.g., 256 chips) to generate a symbol. In one aspect, the despread circuit 230 may despread the output samples by three time-shifted versions of a code (e.g., pilot code) spaced half a chip apart to generated early, on-time and late symbols, as discussed further below.

A write circuit 235 may write the symbols to the vector register 120. The execution unit 130 may access the symbols from the vector register 120 for further processing. Alternatively, the symbols may undergo additional processing by additional circuits in the vector execution unit 130 before being written to the vector register 120 by the write circuit 235. The symbols may also be written to the LMEM, in which the symbols may be accessed from the LMEM by another processor for further processing (e.g., combining, demodulation, decoding, etc.).

The rake-finger circuit 205 in the vector execution unit 130 is able to perform a rake-finger operation (e.g., rotation, FIR filtering, and despreading) in one data flow without having to temporarily store intermediate results (e.g., rotated samples) in the vector register 120. As a result, after performing the rotation operation, the vector execution unit 130 does not need to be reprogrammed to perform the FIR filter operation. Similarly, after performing the FIR filter operation, the vector execution unit 130 does not need to be reprogrammed to perform the despread operation. Thus, the rake-finger circuit 205 allows the vector execution unit 130 to be programmed (configured) to perform a rake-finer operation in one instruction.

Figure 3:
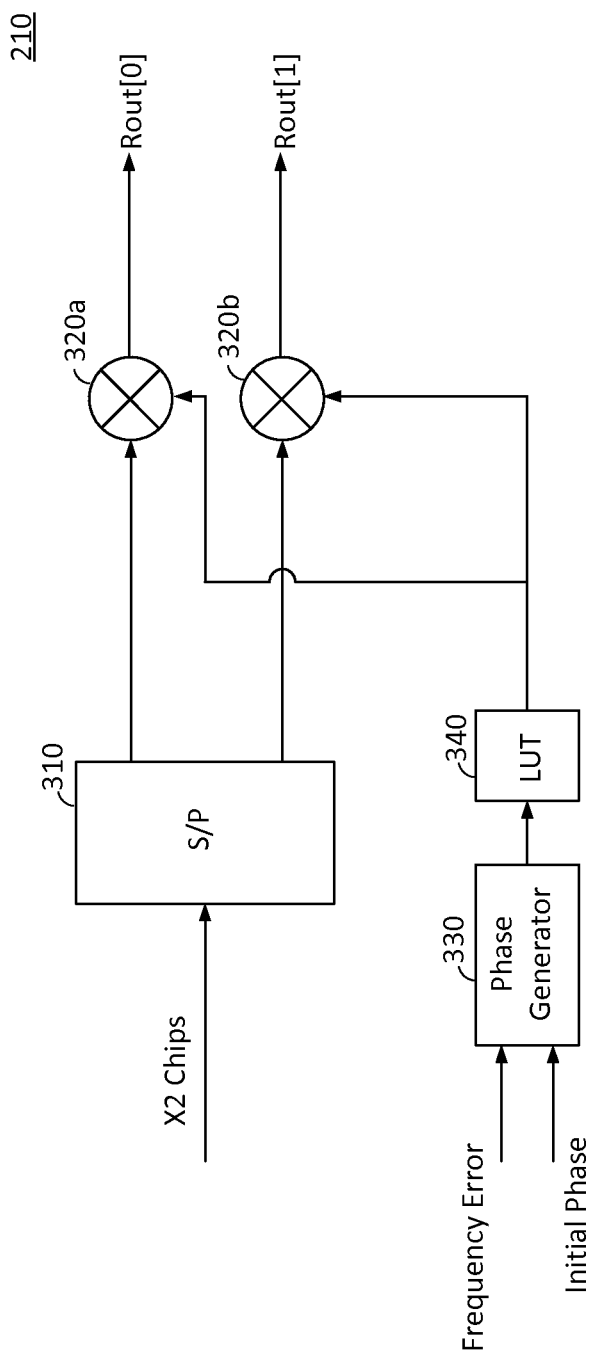
FIG. 3 shows a rotator configured to compensate for carrier frequency offset according to an embodiment of the present disclosure.

FIG. 3 shows an exemplary implementation of the rotator 210 according to an embodiment of the present disclosure. In this embodiment, the rotator 210 comprises a serial-to-parallel (S/P) circuit 310, a first complex multiplier 320a, a second complex multiplier 320b, a phase generator 330, and a look-up table (LUT) circuit 340.

The S/P circuit 310 receives samples from the vector register 120. As discussed above, the samples may be generated by sampling a signal at twice the chip rate. The S/P circuit 310 may input half of the received samples to the first multiplier 320a and input the other half of the received samples to the second multiplier 320b. For example, the S/P circuit 310 may input even-numbered samples to the first multiplier 320a, and input odd-numbered samples to the second multiplier 320b, or vice versa. In this example, the multipliers 320a and 320b process two samples in parallel per clock cycle, in which the two samples correspond to one chip period.

The phase generator 330 receives a frequency error and an initial phase. The frequency error represents the carrier frequency offset between the transmitter and the receiver. The carrier frequency offset shows up as phase rotations in the samples. To compensate for the carrier frequency offset, the phase generator 330 generates phases based on the frequency error and the initial phase, in which the generated phases compensate for phase rotations in the samples caused by the carrier frequency offset. In one aspect, the phase generator 330 may generate a phase for each pair of samples output from the S/P circuit 310 to the multipliers 320a and 320b, in which both samples are rotated by the same phase.

The phases from the phase generator 330 are input to the LUT circuit 340. The LUT circuit 340 converts each phase into a corresponding complex number according to a look-up table that maps different phases to corresponding complex numbers. Each complex number is input to the first and second multipliers 320a and 320b, which multiply a pair of samples from the S/P circuit 310 by the complex number. Each of the complex multiplications rotates the respective sample by the phase corresponding to the complex number.

Thus, for each cycle, the rotator 210 rotates two samples by the same phase to compensate for carrier frequency offset. The rotator 210 outputs the two resulting rotated samples (denoted Rout[0] and Rout[1]) for each cycle to the FIR filter circuit 220 in parallel. In one aspect, the rotator 210 may round and saturate each rotated sample before outputting the rotated sample to the FIR filter circuit 220 to convert the rotated sample into a desired format (e.g., 8SC format).

Figure 4:
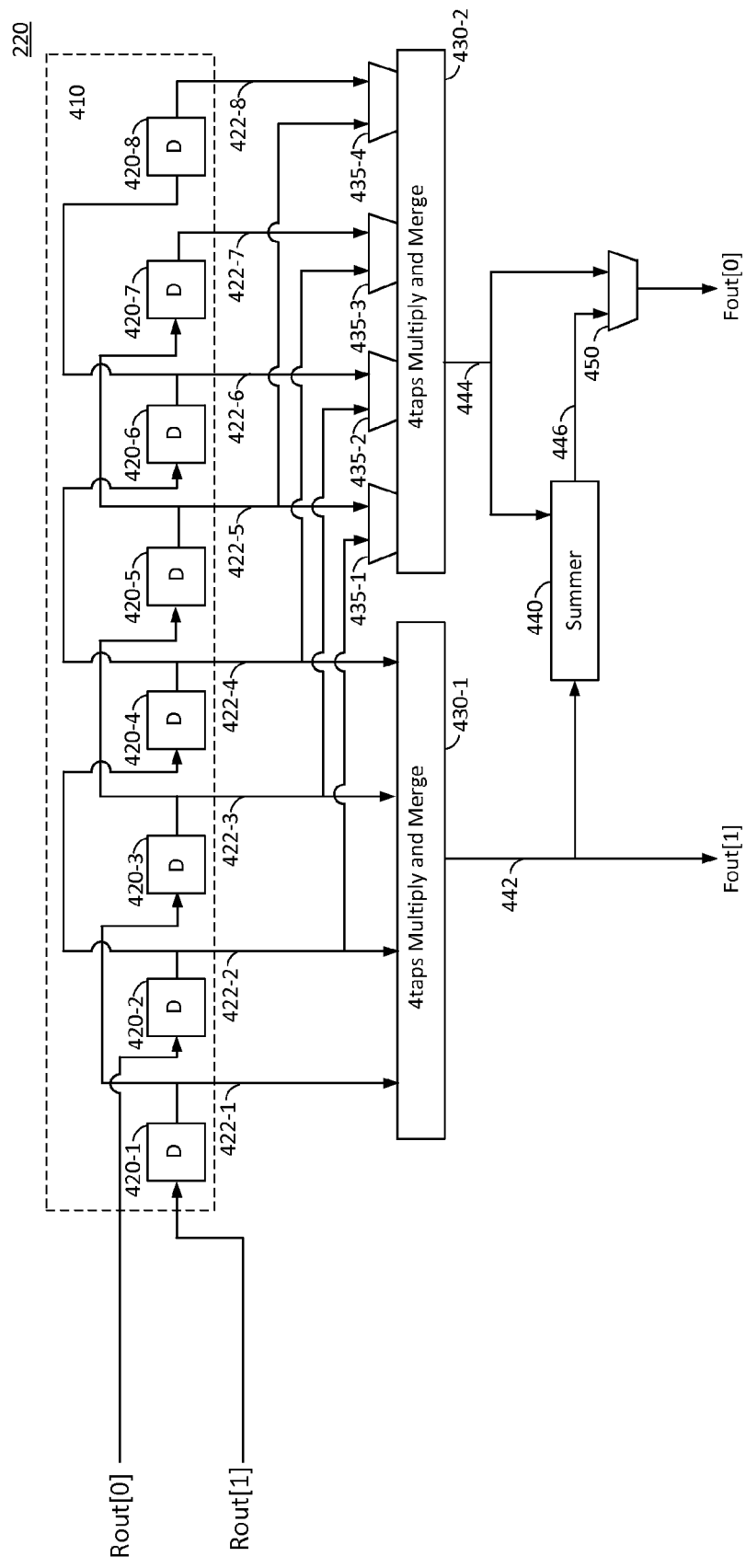
FIG. 4 shows a finite impulse response (FIR) filter circuit according to an embodiment of the present disclosure.

FIG. 4 shows an exemplary implementation of the FIR filter circuit 220 according to an embodiment of the present disclosure. In this embodiment, the FIR filter circuit 220 comprises a delay line 410, a first multiply and merge circuit 430-1, a second multiply and merge circuit 430-2, a summer 440, and an output multiplexer 450. As discussed further below, the FIR filter circuit 220 may be programmed to operate in a four-tap mode or an eight-tap mode. In the four-tap mode, the FIR filter circuit 220 implements a first four-tap FIR filter and a second four-tap FIR filter spaced half a chip apart. In an eight-tap mode, the FIR filter circuit 220 implements an eight-tap FIR filter.

The delay line 410 comprises a plurality of delay elements 420-1 to 420-8. In the example shown in FIG. 4, the delay line 410 has eight taps 422-1 to 422-8, where each tap 422-1 to 422-8 taps the delay line 410 at an output of a different one of the delay elements 420-1 to 420-8.

In one aspect, delay elements 420-1, 420-3, 420-5 and 420-7 are coupled in series, and delay elements 420-2, 420-4, 420-6 and 420-8 are coupled in series. The delay elements 420-1 to 420-8 are arranged in the delay line 410 such that the delay elements 420-1, 420-3, 420-5 and 420-7 are interlaced with the delay elements 420-2, 420-4, 420-6 and 420-8. The rotator 210 outputs the rotated samples Rout[0] from the first multiplier 320a to delay element 420-2, and outputs the rotated samples Rout[1] from the second multiplier 320b to delay element 420-1. As a result, the rotated samples Rout[0] from the first multiplier 320a propagate down delay elements 420-2, 420-4, 420-6 and 420-8 in the delay line 410, and the rotated samples Rout[1] from the second multiplier 320b propagate down delay elements 420-1, 420-3, 420-5 and 420-7 in the delay line 410. Thus, the delay line 410 is updated with two samples per cycle, and the samples in the delay line 410 are shifted by two tap positions in the delay line 410 per cycle. For example, a sample at tap 422-2 is shifted to tap 422-4 in one cycle.

The first multiply and merge circuit 430-1 is coupled to taps 422-1 to 422-4 of the delay line 410. The first multiply and merge circuit 430-1 multiplies the sample from each of the taps 422-1 to 422-4 by a respective filter coefficient, and sums the resulting products. When the FIR filter circuit 220 is programmed to operate in the four-tap mode, the output 442 of the first multiply and merge circuit 430-1 is used for the filter output Fout[1] of the first four-tap FIR filter implemented by the FIR filter circuit 220 in the four-tap mode. When the FIR filter circuit 220 is programmed to operate in the eight-tap mode, the output 442 of the first multiply and merge circuit 430-1 is input to the summer 440 to be summed with an output 444 of the second multiply and merge circuit 430-2, as discussed further below.

The second multiply and merge circuit 430-2 is coupled to either taps 422-2 to 422-5 of the delay line 410 or taps 422-5 to 422-8 of the delay line 410 by four multiplexers 435-1 to 435-4 depending on the operating mode of the FIR filter circuit 220. In the four-tap mode, the multiplexers 435-1 to 435-4 couple taps 422-2 to 422-5 to the second multiply and merge circuit 430-2. In this mode, the second multiply and merge circuit 430-2 multiplies the sample from each of the taps 422-2 to 422-5 by a respective filter coefficient, and sums the resulting products. The output 444 of the second multiply and merge circuit 430-2 is output by the output multiplexer 450 as the filter output Fout[0] for the second four-tap FIR filter implemented by the FIR filter circuit 220 in the four tap-mode.

In the eight-tap mode, the multiplexers 435-1 to 435-4 couple taps 422-5 to 422-8 to the second multiple and merge circuit 430-2. In this mode, the second multiply and merge circuit 430-2 multiplies the sample from each of the taps 422-5 to 422-8 by a respective filter coefficient, and sums the resulting products. The summer 440 sums the output 444 of the second multiply and merge circuit 430-2 with the output 442 of the first multiply and merge circuit 430-1. The resulting output 446 of the summer 440 is output by the output multiplexer 450 as the filter output Fout[0] for the eight-tap FIR filter implemented by the FIR filter circuit 220 in the eight tap-mode.

Thus, the FIR filter circuit 220 may be programmed to implement first and second four-tap FIR filters spaced half a chip apart in the four-tap mode, and implement an eight-tap FIR filter in the eight-tap mode. It is to be appreciated that the present disclosure is not limited to four-tap and eight-tap FIR filters, and that the FIR filter circuit 220 may implement FIR filters of other sizes.

Figure 5A:
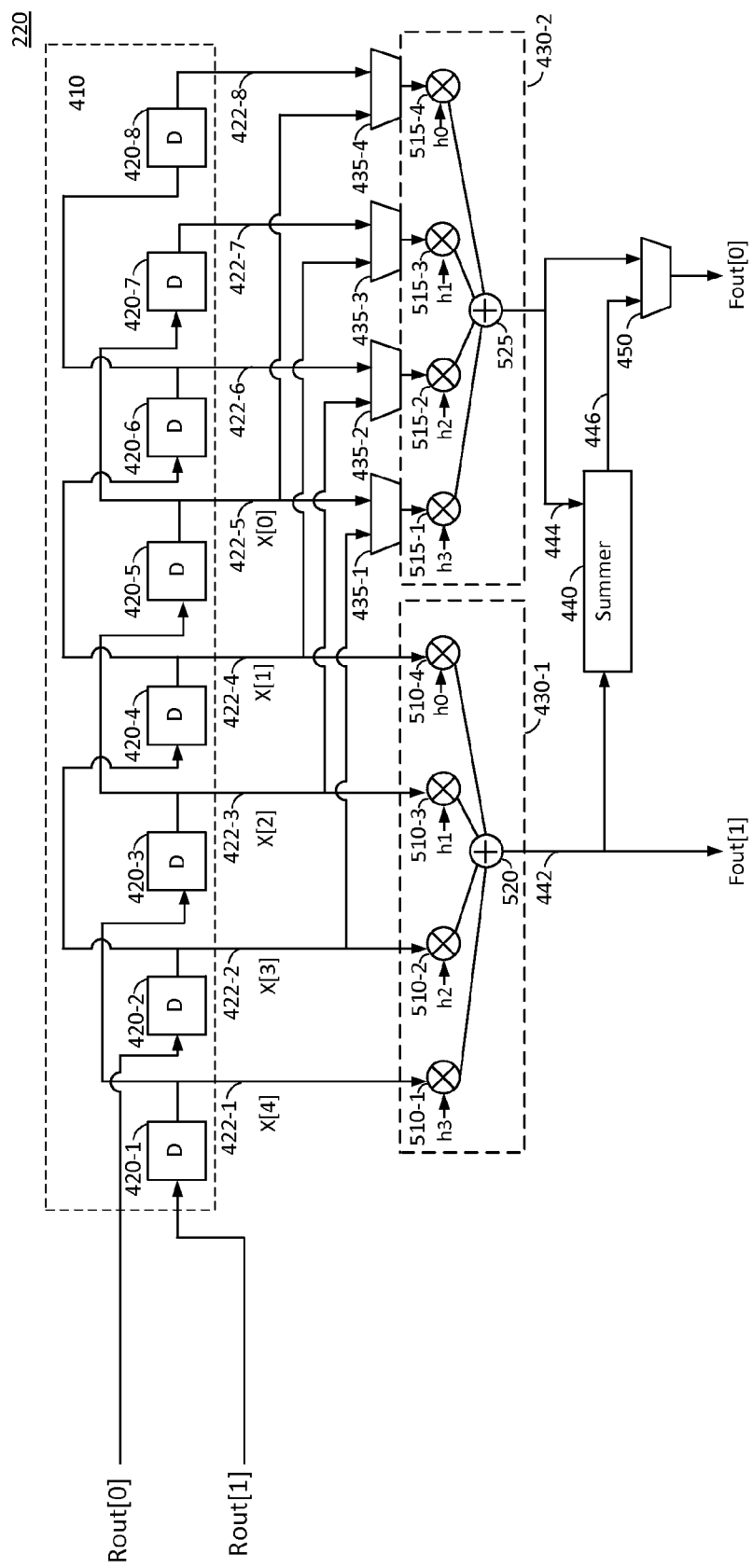
FIG. 5A shows an example of the FIR filter circuit implementing two four-tap FIR filters according to an embodiment of the present disclosure.

FIG. 5A shows an example in which the FIR filter circuit 220 is programmed to implement the first and second four-tap FIR filters in the four-tap mode. In this example, the first multiply and merge circuit 430-1 comprises four multipliers 510-1 to 510-4 and an adder 520. The multipliers 510-1 to 510-4 are coupled to taps 422-1 to 422-4, respectively. Each multiplier 510-1 to 510-4 is configured to multiply the sample from the respective tap by a respective filter coefficient h0 to h3. The adder 520 is configured to sum the resulting products from the multipliers 510-1 to 510-4 to generate a filter output sample for the first four-tap FIR filter.

The second multiply and merge circuit 430-2 comprises four multipliers 515-1 to 515-4 and an adder 525. The multipliers 515-1 to 515-4 are coupled to taps 422-2 to 422-5, respectively, by multiplexers 435-1 to 435-4. Each multiplier 515-1 to 515-4 is configured to multiply the sample from the respective tap by a respective filter coefficient h0 to h3. The adder 525 is configured to sum the resulting products from the multipliers 515-1 to 515-4 to generate a filter output sample for the second four-tap FIR filter. As shown in FIG. 5A, the first and second four-tap filters may use the same filter coefficients h0 to h3.

In this example, the first and second four-tap FIR filters output two filter output samples per cycle, in which the two filter output samples are half a chip apart. More particularly, the filter output sample from the second four-tap FIR filter is half a chip ahead of the filter output sample from the first four-tap FIR filter. This may be demonstrated with reference to FIG. 5A. FIG. 5A shows an example in which the samples X[0] to X[3] are input to the second four-tap FIR filter implemented by the second multiply and merge circuit 430-2, and samples X[1] to X[4] are input to the first four-tap FIR filter implemented by the first multiply and merge circuit 430-1. The sample indices indicate the sampling order of the samples, in which a lower index corresponds to an earlier sampling time. In this example, the filter output for the second four-tap filter may be given by:

$$Fout[0]=h0\cdot X[0]+h1\cdot X[1]+h2\cdot X[2]+h3\cdot X[3] \quad \text{Eq. (1)}.$$

The filter output for the first four-tap filter may be given by:

$$Fout[1]=h0\cdot X[1]+h1\cdot X[2]+h2\cdot X[3]+h3\cdot X[4] \quad \text{Eq. (2)}.$$

Thus, the filter output Fout[0] for the second four-tap FIR filter is generated from samples X[0] to X[3] that are half a chip earlier than the corresponding samples X[1] to X[4] for the first four-tap FIR filter. As a result, the filter output sample from the second four-tap FIR filter is half a chip ahead of the filter output sample from the first four-tap FIR filter. In one aspect, each filter output sample may be truncated and saturated before being output to the despread circuit 230 to convert the filter output sample into a desired format (e.g., 16SC format).

Thus, an instruction for programming the FIR filter circuit 220 to operate in the four-tap mode may instruct multiplexers 435-1 to 435-4 to select taps 422-2 to 422-5 for input to multipliers 515-1 to 515-4, respectively, of the second multiply and merge circuit 430-2. The instruction may also instruct the output multiplexer 450 to select the output of the second multiply and merge circuit 430-2 for output to the despread circuit 230. Further, the instruction may program each multiply and merge circuit 430-1 to 430-2 with filter coefficients h0 to h3. As discussed above, the FIR filters are used to determine sample values that are a fractional chip period offset from the sampling time of the ADC used to generate the samples input to the rake-finger circuit 205. The values of the filter coefficients h0 to h3 may be selected to achieve the desired fractional chip period offset. Exemplary techniques for determining the arrival time of the signal being processed by the rake-finger circuit 205 are provided below.

Figure 5B:
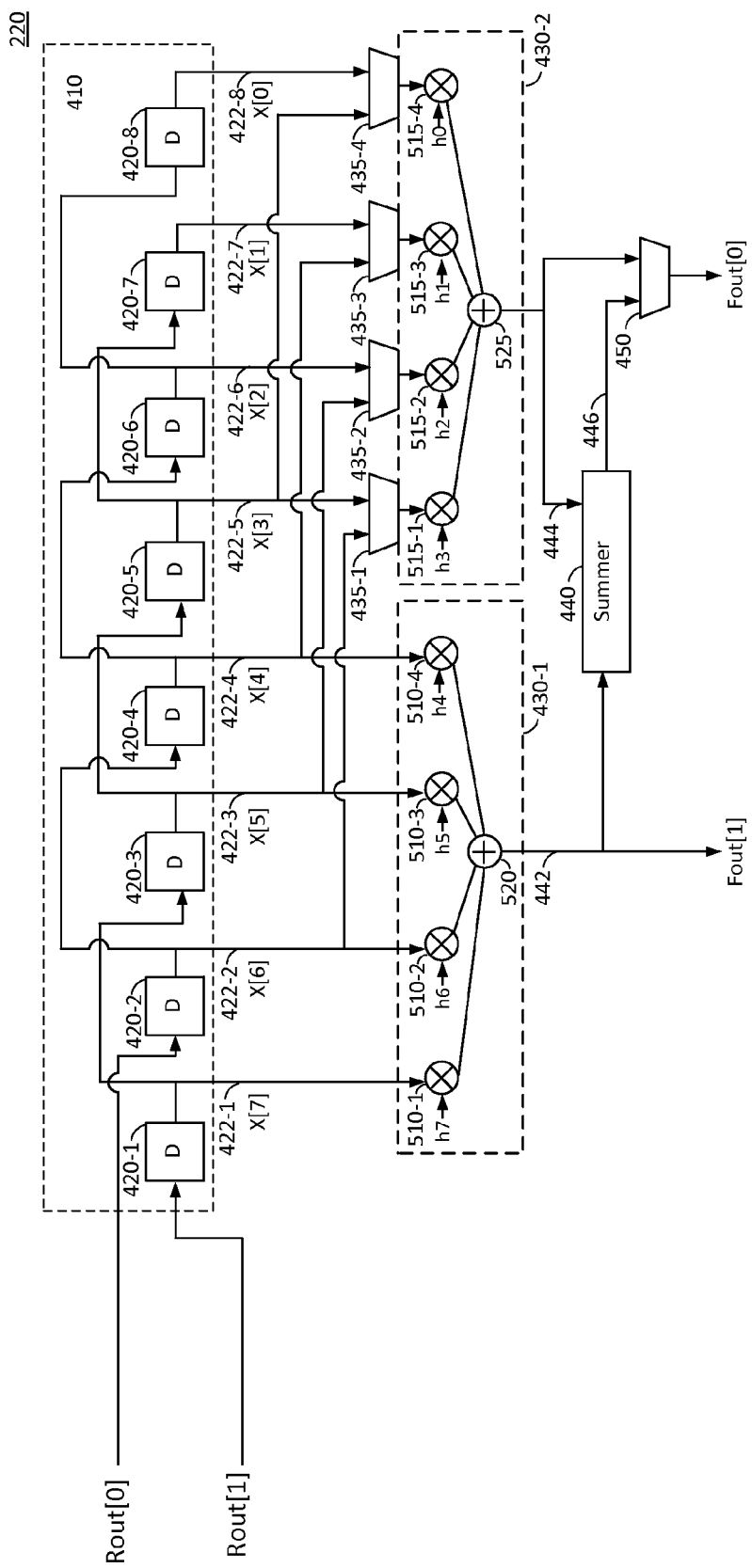
FIG. 5B shows an example of the FIR filter circuit implementing an eight-tap FIR filter according to an embodiment of the present disclosure.

FIG. 5B shows an example in which the FIR filter circuit 220 is programmed to implement the eight-tap FIR filter in the eight-tap mode. In this example, the multipliers 515-1 to 515-4 in the second multiply and merge circuit 430-2 are coupled to taps 422-5 to 422-8, respectively, by multiplexers 435-1 to 435-4. Each multiplier 515-1 to 515-4 multiplies the sample from the respective tap by a respective filter coefficient h0 to h3. The adder 525 sums the resulting products from the multipliers 515-1 to 515-4, and outputs the resulting sum to the summer 440.

The multipliers 510-1 to 510-4 in the first multiply and merge circuit 430-1 are coupled to taps 422-1 to 422-4, respectively. Each multiplier 510-1 to 510-4 multiplies the sample from the respective tap by a respective filter coefficient h4 to h7. The adder 520 sums the resulting products from the multipliers 510-1 to 510-4, and outputs the resulting sum to the summer 440. The summer 440 then sums the two sums from the first and second multiply and merge circuits 430-1 and 430-2. The resulting sum from the summer 440 provides a filter output sample for the eight-tap FIR filter. The filter output for the eight-tap FIR filter may be given by:

$$Fout[0]=h0\cdot X[0]+h1\cdot X[1]+h2\cdot X[2]+h3\cdot X[3]+h4\cdot X[4]+ \\ h5\cdot X[5]+h6\cdot X[6]+h7\cdot X[7] \quad \text{Eq. (3)}$$

where X[0] to X[7] are the samples from taps 422-8 to 422-1, respectively, shown in FIG. 5B. In one aspect, each filter output sample may be truncated and saturated before being output to the despread circuit 230 to convert the filter output sample into a desired format (e.g., 16SC format).

Thus, an instruction for programming the FIR filter circuit 220 to operate in the eight-tap mode may instruct multiplexers 435-1 to 435-4 to select taps 422-5 to 422-8 for input to multipliers 515-1 to 515-4, respectively, of the second multiply and merge circuit 430-2. The instruction may also instruct the summer 440 to sum the outputs of the first and second multiply and merge circuits 430-1 and 430-2, and instruct the output multiplexer 450 to select the output 446 of the summer 440 for output to the despread circuit 230. Further, the instruction may program each multiply and merge circuit 430-1 to 430-4 with a different half of the filter coefficients h0 to h7 for the eight-tap FIR filter. The eight-tap FIR filter in the eight-tap mode is capable of interpolating sample values with higher resolution than either of the four-tap FIR filters in the four-tap mode, and may be used when tighter timing constraints need to be met.

Figure 6A:
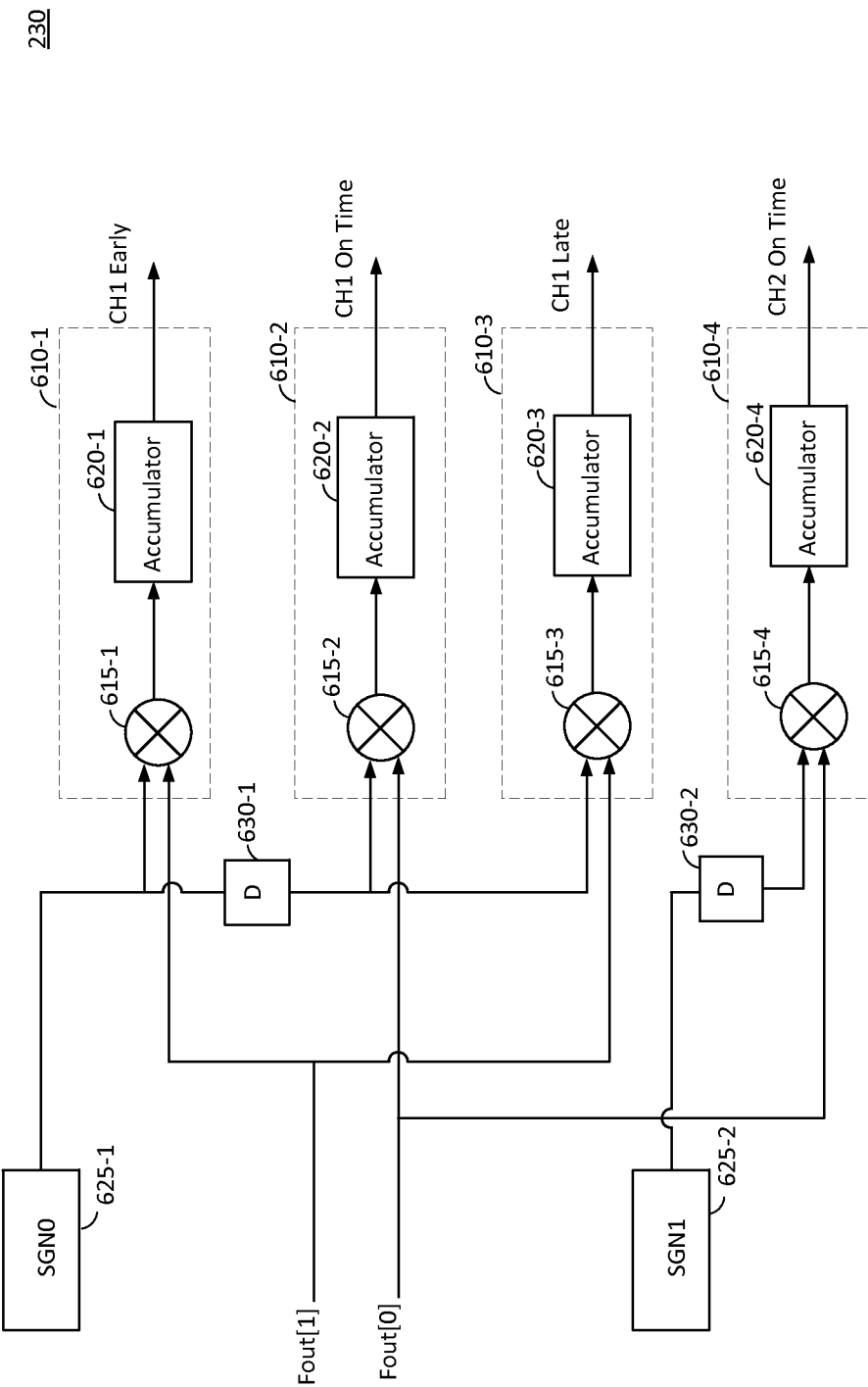
FIG. 6A shows an example of a despread circuit configured to process the outputs of the two four-tap FIR filters to generate early, on-time and late symbols according to an embodiment of the present disclosure.

FIG. 6A shows an exemplary implementation of the despread circuit 230 according to an embodiment of the present disclosure. In the example shown in FIG. 6A, the despread circuit 230 is configured to process the filter outputs Fout[0] and Fout[1] from the FIR filter circuit 220 in the four-tap mode. The despread circuit 230 comprises first and second code generators 625-1 and 625-2, first and second delay elements 630-1 and 630-2, and first, second, third and fourth despread blocks 610-1 to 610-4. Each despread block 610-1 to 610-4 comprises a multiplier 615-1 to 615-4 and an accumulator 620-1 to 620-4.

In operation, the first code generator 625-1 generates a first code corresponding to a first channel (CH1). The first channel may comprise a pilot channel (e.g., a Common Pilot Channel (CPICH)), and the first code may have a predetermined code length (e.g., 256 chips). The first code is input to the first despread block 610-1. The first code is delayed by one chip by the first delay element 630-1 to generate a chip-delayed first code, which is input to second and third despread blocks 610-2 and 610-3. The filter output Fout[1] from the first four-tap FIR filter is input to the first and third despread blocks 610-1 and 610-3, and the filter output Fout[0] from the second four-tap FIR filter is input to the second despread block 610-2.

In the first despread block 610-1, the respective multiplier 615-1 despreads the filter output Fout[1] with the first code. The respective accumulator 620-1 accumulates the despreaded output from the respective multiplier 615-1 over the length of the first code (e.g., 256 chips) to generate an early symbol for the first channel (denoted CH1 Early in FIG. 6A).

In the second despread block 610-2, the respective multiplier 615-2 despreads the filter output Fout[0] with the chip-delayed first code. The respective accumulator 620-2 accumulates the despreaded output from the respective multiplier 615-2 over the length of the first code (e.g., 256 chips) to generate an on-time symbol for the first channel (denoted CH1 On Time in FIG. 6A). The early symbol from the first despread block 610-1 is half a chip early with respect to the on-time symbol from the second despread block 610-2.

In the third despread block 610-3, the respective multiplier 615-3 despreads the filter output Fout[1] with the chip-delayed first code. The respective accumulator 620-3 accumulates the despreaded output from the respective multiplier 615-3 over the length of the first code (e.g., 256 chips) to generate a late symbol for the first channel (denoted CH1 Late in FIG. 6A). The late symbol from the third despread block 610-3 is half a chip late with respect to the on-time symbol from the second despread block 610-2.

Thus, for each symbol period, the despread circuit 230 may output early, on-time and late symbols for the first channel (e.g., CPICH). The early, on-time and late symbols may be processed to determine whether the timing of the rake-finger circuit 205 needs to be updated, e.g., due to changing channel conditions between the transmitter and the receiver. For example, the energy levels of the early, on-time and later symbols may be computed, and compared with one another to determine which of the symbols has the highest energy level. If the on-time symbol has the highest energy level, then the current timing of the rake-finger circuit 205 is maintained. If the early symbol has the highest energy level, then the timing of the rake-finger circuit 205 may be advanced by half a chip, and, if the late symbol has the highest energy, then the timing of the rake-finger circuit 205 may be pushed back by half a chip.

The second code generator 625-2 generates a second code corresponding to a second channel (CH2) having a predetermined code length. The second code may be time aligned with the first code. The second code is delayed by one chip by the second delay element 630-2 to generate a chip-delayed second code, which is input to the fourth despread block 610-4. The filter output Fout[0] from the second four-tap FIR filter is input to the fourth despread block 610-4.

In the fourth despread block 610-4, the respective multiplier 615-4 despreads the filter output Fout[0] with the chip-delayed second code. The respective accumulator 620-4 accumulates the despreaded output from the respective multiplier 615-4 over the length of the second code to generate an on-time symbol for the second channel (denoted CH2 On Time in FIG. 6A).

In the example shown in FIG. 6A, the despread circuit 230 outputs four symbols at a time (i.e., early, on-time and late symbols for the first channel (CH1) and an on-time symbol for the second channel (CH2)). However, it is to be appreciated that the present disclosure is not limited to four symbols. For example, the despread circuit 230 may use additional code generators and/or despread blocks to generate more than four symbols from the filter outputs Fout[0] and Fout[1].

FIG. 6B shows an example in which the despread circuit 230 is configured to process the filter output Fout[0] from the FIR filter circuit 230 in the eight-tap mode to generate on-time symbols for the first and second channels (CH1 and CH2). The first code from the first code generator 625-1 is input to the second despread block 610-2 and the second code from the second code generator 625-2 is input to the fourth despread block 610-4. The filter output Fout[0] from the eight-tap FIR filter implemented by the FIR filter circuit 220 is input to both the second and fourth despread blocks 610-2 and 610-4.

In the second despread block 610-2, the respective multiplier 615-2 despreads the filter output Fout[0] with the first code, and the respective accumulator 620-2 accumulates the despreaded output from the respective multiplier 615-2 over the length of the first code (symbol period) to generate an on-time symbol for the first channel (CH1 On Time). In the fourth despread block 610-4, the respective multiplier 615-4 despreads the filter output Fout[0] with the second code, and the respective accumulator 620-4 accumulates the despreaded output from the respective multiplier 615-4 over the length of the second code (symbol period) to generate an on-time symbol for the second channel (CH2 On Time).

FIG. 6C shows an example in which the despread circuit 230 is configured to process the filter output Fout[0] from the FIR filter circuit 230 in the eight-tap mode to generate early and late symbols for the first channel (CH1). The first code is delayed by one chip by delay element 630-1 to generate a chip-delayed first code, which is input to the fourth despread block 610-4. The filter output Fout[0] from the eight-tap FIR filter implemented by the FIR filter circuit 220 is input to both the second and fourth despread blocks 610-2 and 610-4.

In the second despread block 610-2, the respective multiplier 615-2 despreads the filter output Fout[0] with the first code, and the respective accumulator 620-2 accumulates the despreaded output from the respective multiplier 615-2 over the length of the first code (symbol period) to generate an early symbol for the first channel (CH1 Early). In the fourth despread block 610-4, the respective multiplier 615-4 despreads the filter output Fout[0] with the chip-delayed first code, and the respective accumulator 620-4 accumulates the despreaded output from the respective multiplier 615-4 over the length of the first code (symbol period) to generate a late symbol for the first channel (CH1 Late). The late symbol is one chip late with respect to the early symbol. This is because despreading starts one chip later in the fourth despread block 615-4 than in the second despread block 615-2 due to the first delay element 630-1.

To generate early, on-time and late symbols in the eight-tap mode, the despread circuit 230 may be alternately programmed into the configurations shown in FIGS. 6B and 6C. For example, the despread circuit 230 may be alternately programmed into the configurations in FIGS. 6B and 6C using a routing circuit (not shown) that configures the code path to the fourth despread block 610-4. The routing circuit may comprise one or more programmable switches. For example, for the configuration in FIG. 6B, the routing circuit may be programmed to form a path between the second code generator 625-2 and the multiplier 615-4 in the fourth despread block 610-4. For the configuration in FIG. 6C, the routing circuit may be programmed to form a path between the first code generator 625-1 and the multiplier 615-4 in the fourth despread block 610-4 through delay element 630-1.

The routing circuit may also be used to program the despread circuit 230 into the configuration shown in FIG. 6A. In this regard, for the configuration in FIG. 6A, the routing circuit may be programmed to form a path between the first code generator 625-1 and the multiplier 615-2 in the second despread block 610-2 through the first delay element 630-1, and form a path between the second code generator 625-2 and the multiplier 615-4 in the fourth despread block 610-4 through the second delay element 630-2.

In one embodiment, the vector execution unit 130 may be programmed (configured) to perform a Fast Fourier Transform (FFT) operation reusing components used for the rake-finger circuit 205. The FFT operation may be used to convert time-domain samples into frequency-domain samples.

A four-point FFT may be expressed by the following matrix multiplication:

$$\begin{bmatrix} y_1 \\ y_2 \\ y_3 \\ y_4 \end{bmatrix} = \begin{bmatrix} w_{11} & w_{12} & w_{13} & w_{14} \\ w_{21} & w_{21} & w_{23} & w_{24} \\ w_{31} & w_{32} & w_{33} & w_{34} \\ w_{41} & w_{42} & w_{43} & w_{44} \end{bmatrix} \begin{bmatrix} x_1 \\ x_2 \\ x_3 \\ x_4 \end{bmatrix} \quad \text{Eq. (4)}$$

where $x_1$ to $x_4$ are the input samples to the FFT, $y_1$ to $y_4$ are the output samples of the FFT, and $w_{11}$ to $w_{44}$ are matrix coefficients for a 4×4 FFT matrix. Each of the matrix coefficients may have a value of +1, 1, +j or −j, where j is an imaginary number.

Figure 7:
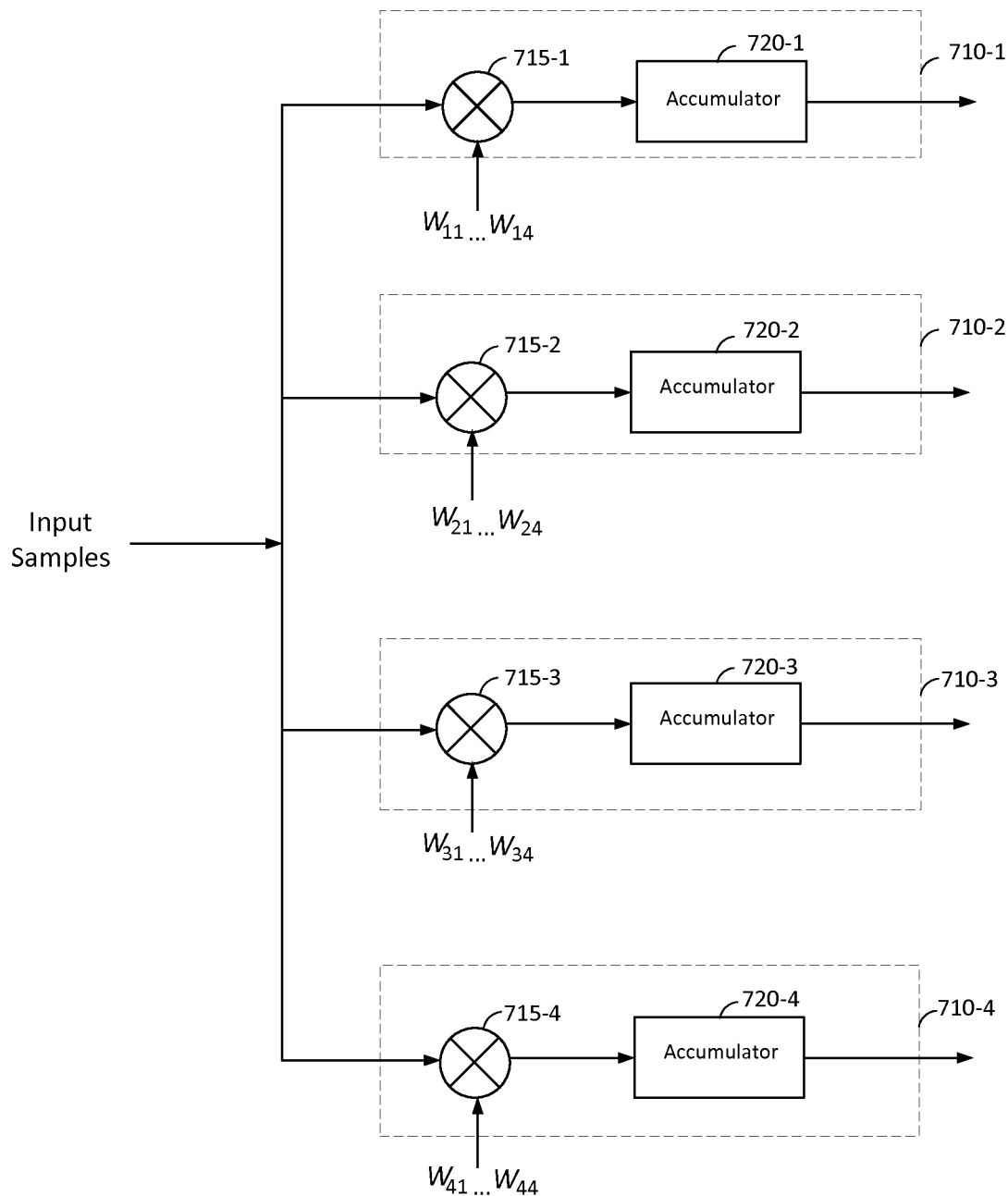
FIG. 7 shows a Fast Fourier Transform (FFT) circuit according to an embodiment of the present disclosure.

FIG. 7 shows an example of an FFT circuit 705 that may be implemented in the vector execution unit 130 according to an embodiment of the present disclosure. In the example shown in FIG. 7, the FFT circuit 705 performs a four-point FFT operation, although it is to be appreciated that embodiments of the present disclosure may perform FFT operations of other sizes.

The FFT circuit 705 comprises four blocks 710-1 to 710-4, where each block receives samples input to the FFT circuit 705 (e.g., from the vector register 120). To perform a four-point FFT operation, each block 710-1 to 710-4 receives four input samples (i.e., $x_1$ to $x_4$) and generates a respective one of four output samples (i.e., $y_1$ to $y_4$) from the four input samples. For example, block 710-1 generates output sample $y_1$. Each block 710-1 to 710-4 comprises a multiplier 715-1 to 715-4 configured to multiply each input sample by the respective matrix coefficient, and an accumulator 720-1 to 720-4 configured to accumulate the output of the respective multiplier 715-1 to 715-4 over four samples to generate the respective output sample.

A higher-order FFT operation (e.g., a 16-point FFT operation) may be performed with multiple four-point FFT operations. This may be done by decomposing the higher-order FFT operation into multiple stages, in which a plurality of four-point FFT operations are performed in each stage. For example, a 16-point FFT operation may be decomposed into two stages, in which four four-point FFT operations are performed in each stage.

Figure 8:
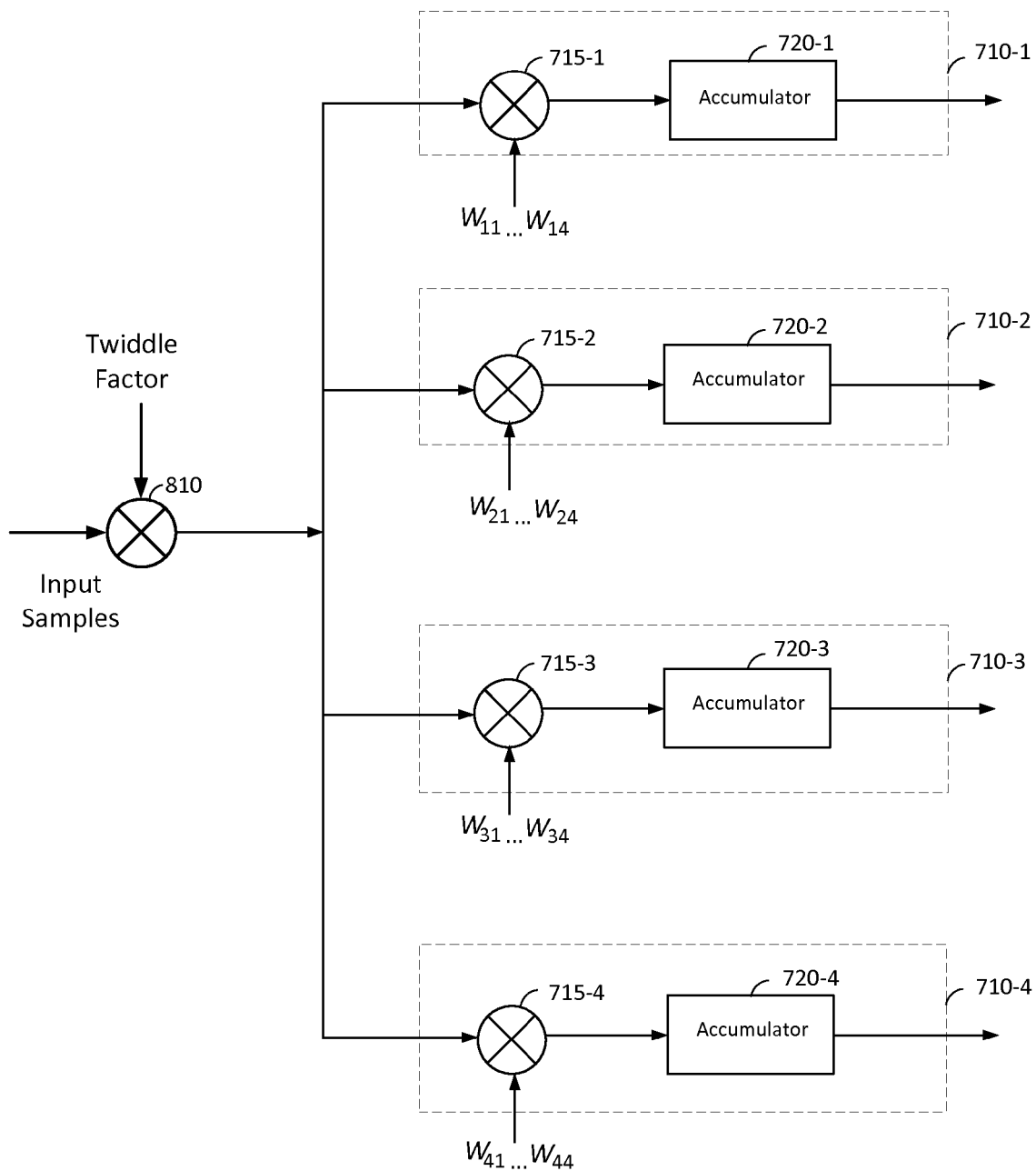
FIG. 8 shows a FFT circuit with twiddle factor multiplication according to an embodiment of the present disclosure.

In this regard, FIG. 8 shows an FFT circuit 805 that may be implemented in the vector execution unit 130 to perform high-order FFT operations according to an embodiment of the present disclosure. The FFT circuit 805 comprises a multiplier 810 and the blocks 710-1 to 710-4 from the previous embodiment. For each stage after the first stage, the multiplier 810 multiplies each sample by a twiddle factor before the sample is input to the four blocks 710-1 to 710-4. The twiddle factors reflect properties of the higher-order FFT operation that allow the higher-order FFT operation to be performed with multiple four-point FFT operations.

The FFT circuit 805 may reuse components of the rake-finger circuit 205. For example, the blocks 710-1 to 710-4 may correspond to despread blocks 610-1 to 610-4 in the despread circuit 230. In another example, the multipliers 715-1 to 715-4 may correspond to four of the multipliers 510-1 to 510-4 and 515-1 to 515-4 in the FIR filter circuit 220.

The vector execution unit 130 may also be programmed to process signals in a Code Division Multiple Access (CDMA) communications system reusing components used to implement the rake-finger circuit 205, as discussed further below. For example, the vector execution unit 130 may be programmed (configured) to perform time searching and/or code searching for a UE (e.g., wireless mobile device) in a CDMA system comprising a network of base stations. Each base station in the CDMA system may be configured to provide services (e.g., voice, data and multimedia services) to UEs within a coverage area (cell) of the CDMA system.

To locate a base station in the CDMA system, a UE may first search for a synchronization signal broadcast by the base station. The synchronization signal may be spread by a Primary Synchronization Channel (P-SCH) code that is common to all base stations in the CDMA system. The P-SCH code is known a priori by the UE; however, the UE may not know the timing of the P-SCH code.

Figure 9:
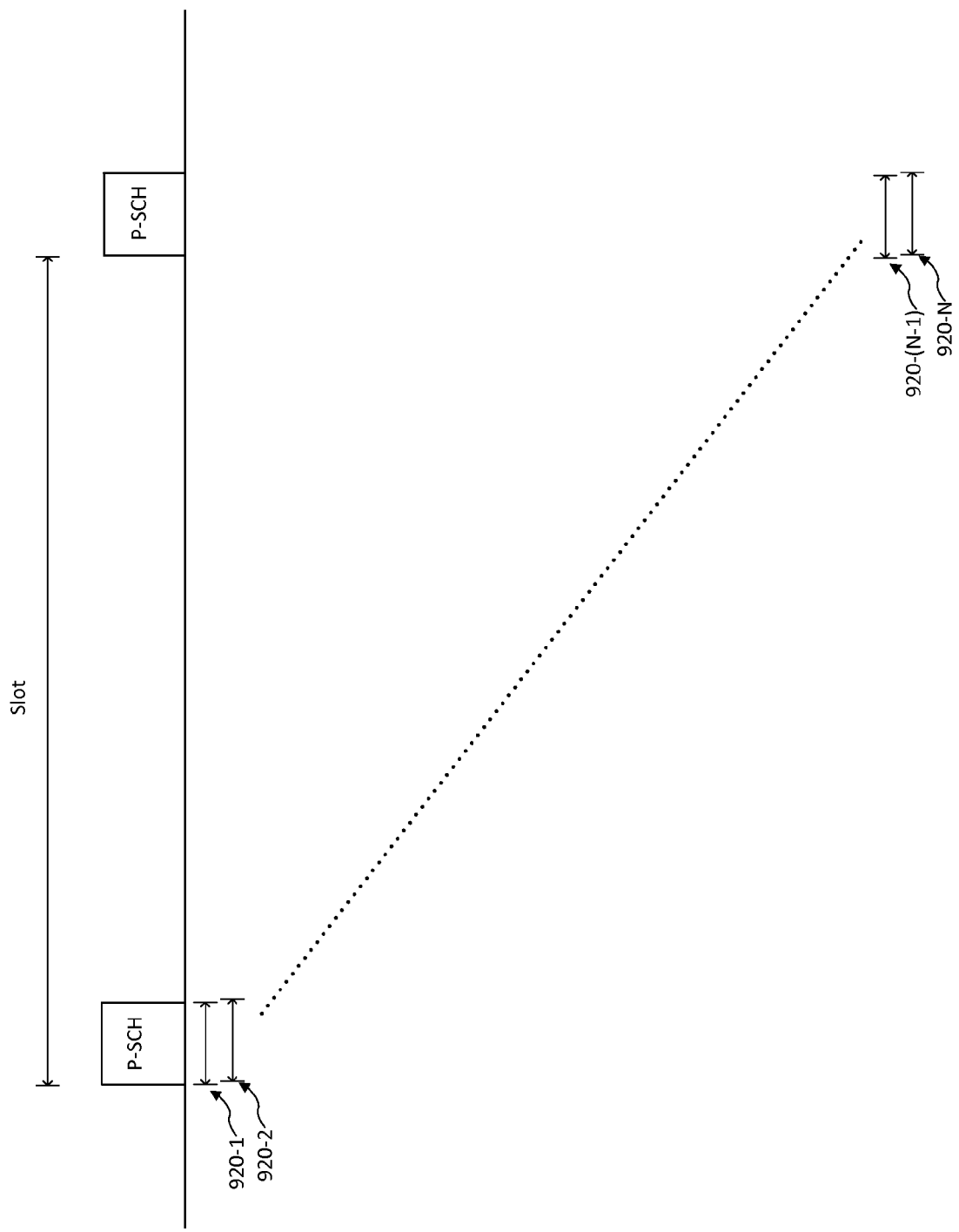
FIG. 9 shows a timing diagram for time synchronization using a Primary Synchronization Channel (P-SCH) code according to an embodiment of the present disclosure.

FIG. 9 is a time diagram illustrating an example of time synchronization using the P-SCH code. In this example, the base station transmits signals using a timing structure comprising a sequence of slots. Each slot may comprise 2560 chips or another number of chips. At the start of each slot, the base station may transmit a synchronization signal spread with the P-SCH code, where the P-SCH code may comprise 256 chips or another number of chips. In the example shown in FIG. 9, the PSCH code (e.g., 256) spans ten percent of the period of a slot (e.g., 2560 chips). As discussed further below, the vector execution unit 130 may be programmed to search for the P-SCH code to determine the timing of the slots.

Figure 10:
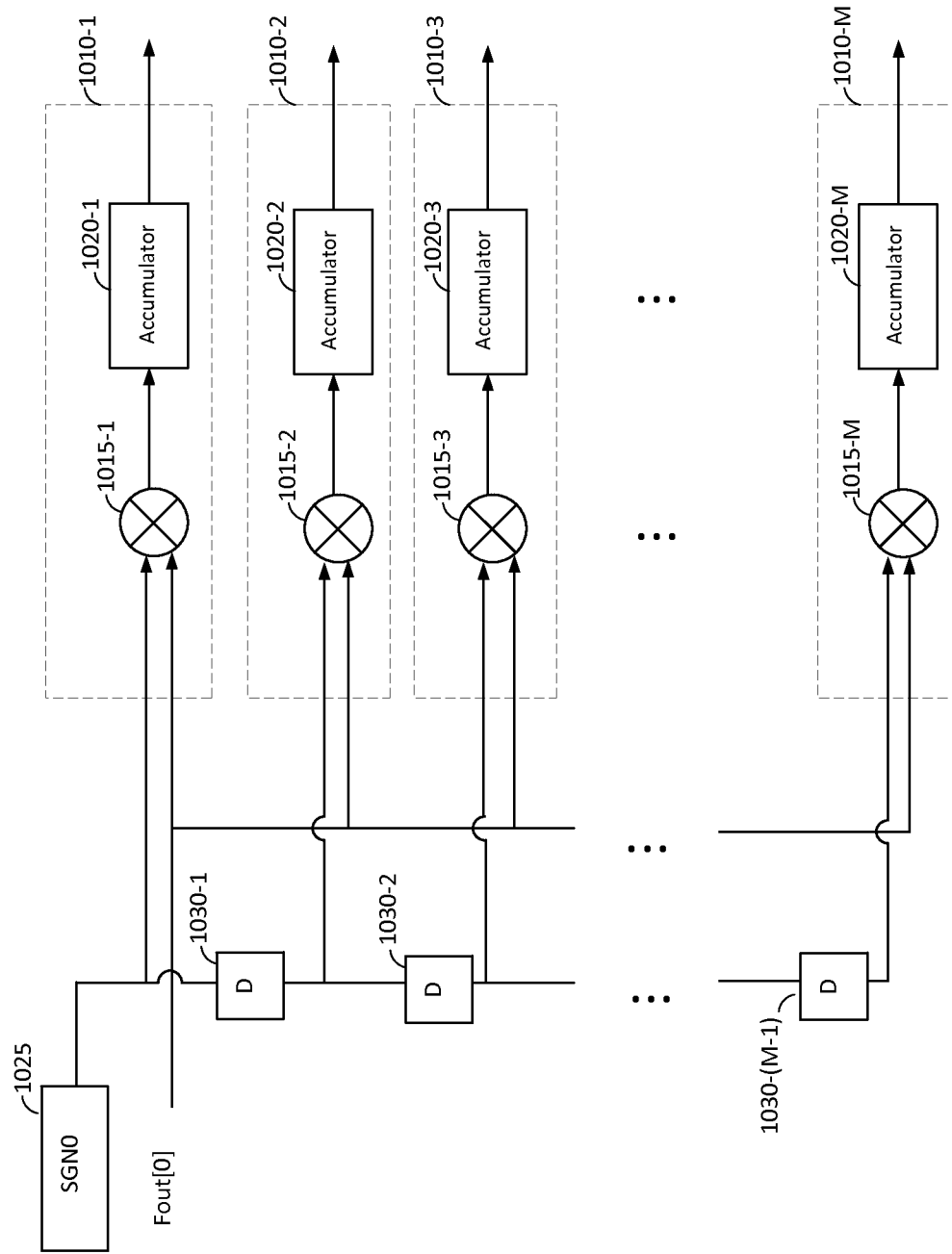
FIG. 10 shows a circuit for performing time searching according to an embodiment of the present disclosure.

FIG. 10 shows a time-searching circuit 1005 implemented in the vector execution unit 130 according to an embodiment of the present disclosure. The time-searching circuit 1005 comprises a code generator 1025, a plurality of delay elements 1030-1 to 1030-(M−1) coupled in series, and a plurality of despread blocks 1010-1 to 1010-M. Each despread block 1010-1 to 1010-M comprises a multiplier 1015-1 to 1015-M and an accumulator 1020-1 to 1020-M.

The time-searching circuit 1005 may reuse components from the rake-finger circuit 205. For example, four of the despread blocks 1010-1 to 1010-M may correspond to despread blocks 610-1 to 610-4 in the rake-finger circuit 205, the code generator 1025 may correspond to one of the code generators 625-1 or 625-2 in the rake-finger circuit 205, and two of the delay elements 1030-1 to 1030-(M−1) may correspond to the delay elements 630-1 and 630-2 in the rake-finger circuit 205. In one aspect, samples from the vector register 120 are rotated by the rotator 210 and/or filtered by the FIR filter circuit 220 before being input to the time-searching circuit 1005.

In operation, the code generator 1025 generates a P-SCH code, which propagates down the plurality of delay elements 1030-1 to 1030-(M−1). The output of each delay element 1030-1 to 1030-(M−1) provides a different time-delayed version of the P-SCH code, and therefore a different time-shifted version of the P-SCH code. In one aspect, each delay element 1030-1 to 1030-(M−1) may have a time delay of one chip. In this aspect, the time-shifted versions of the P-SCH code output by the delay elements 1030-1 to 1030-(M−1) are separated by one chip. Each time-shifted version of the P-SCH code is fed to a respective one of the despread blocks 1010-1 to 1010-M, as shown in FIG. 10.

In each despread block 1010-1 to 1010-M, the respective multiplier 1015-1 to 1015-M despreads the samples input to the time-searching circuit 1005 with the respective time-shifted version of the P-SCH code. The respective accumulator 1020-1 to 1020-M accumulates the output of the respective multiplier 1015-1 to 1015-M over the length of the P-SCH code (e.g., 256 chips) to generate one symbol. The respective accumulator 1020-1 to 1020-M starts accumulating at the start of the respective time-shifted version of the P-SCH code.

The despread blocks 1010-1 to 1010-M output M symbols, where each symbol corresponds to a different time-shifted version of the P-SCH code, and therefore a different time hypothesis. The symbols may be stored in the vector register 120 for further processing. In one embodiment, the symbols may undergo additional processing in the vector execution unit 130 before being stored in the vector register 120. For example, each symbol may be rounded and saturated to convert the symbol into a desired format (e.g., 16SC15 format).

In the example shown in FIG. 9, N time hypotheses 920-1 to 910-N are used to determine the boundary of a slot. If the time hypotheses 920-1 to 920-N are spaced apart by one chip and the slot spans 2560 chips, then 2560 time hypotheses may be needed (i.e., N=2560). As discussed above, the time-searching circuit 1005 generates M symbols at a time corresponding to M different time hypotheses. If M is less than N, then the time-searching circuit 1005 may generate N symbols corresponding to N time hypotheses over multiple iterations, in which the time-searching circuit 1005 generates M symbols corresponding to M time hypotheses in each iteration. For each iteration, the samples input to the time-searching circuit 1005 may be shifted by M chips with respect to the samples input to the time-searching circuit 1005 in the previous iteration.

The N symbols may be stored in the vector register 120 for further processing. In one aspect, slot synchronization with a base station is achieved by determining the energy level of each symbol. In this aspect, the UE may assume that the time hypothesis corresponding to the symbol with the highest energy level is time aligned with a slot boundary, and therefore determine the timing of the slot boundaries based on the time hypothesis corresponding to the symbol with the highest energy level. Thus, the time-searching circuit 1005 may be used to acquire slot synchronization with the base station.

Figure 11:
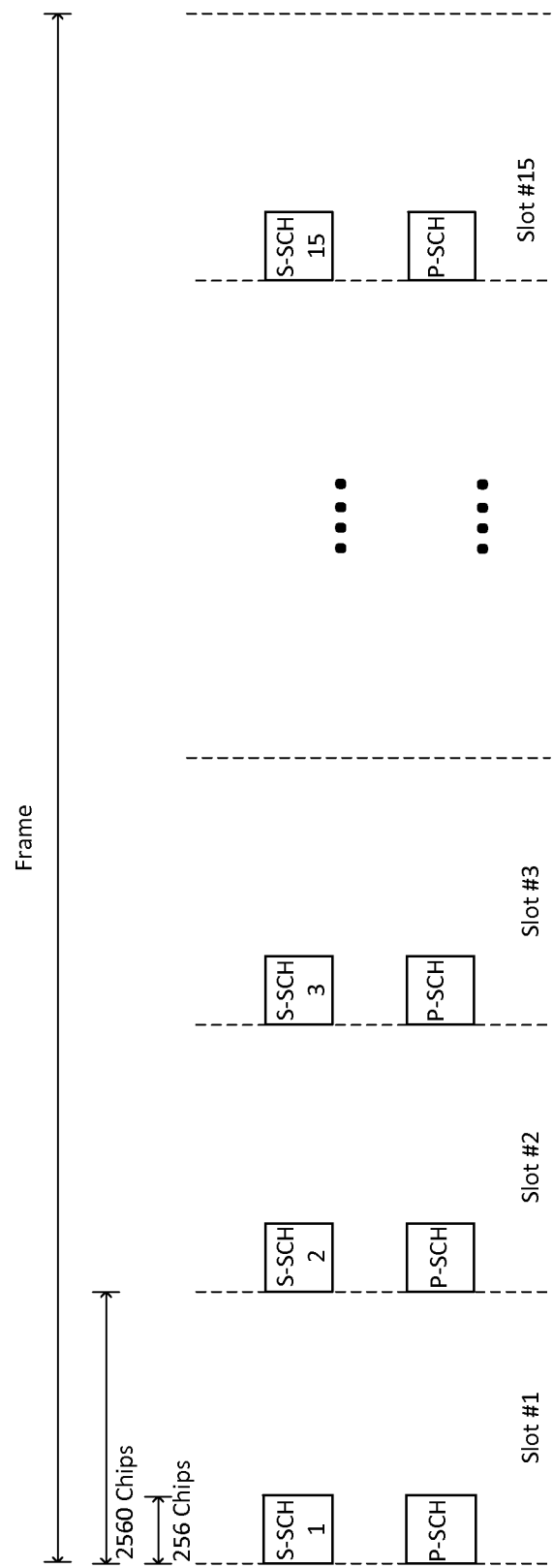
FIG. 11 shows a timing diagram for the P-SCH code and a plurality of Secondary SCH (S-SCH) codes according to an embodiment of the present disclosure.

The timing structure for base station transmissions may also include a frame comprising a plurality of slots. In this regard, FIG. 11 shows an example of a frame comprising 15 slots, in which the P-SCH code is transmitted at the start of each slot. In the example in FIG. 11, each slot spans 2560 chips and the P-SCH code spans 256 chips. It is to be appreciated that FIG. 11 is not drawn to scale for ease of illustration.

As discussed above, the P-SCH code may be used to determine the timing of the slot boundaries. However, the P-SCH code may not provide the timing of frame boundaries. This is because the P-SCH code is repeated in every slot of a frame, and therefore does not distinguish between the first slot in the frame and the other slots in the frame. To enable frame synchronization, the timing structure may comprise a plurality of Secondary SCH (S-SCH) codes, in which the S-SCH code in each slot of a frame is different (denoted S-SCH 1 to S-SCH 15 in FIG. 11). Each S-SCH code is transmitted in parallel with the P-SCH code in the respective slot, and is therefore time aligned with the P-SCH code in the respective slot. Thus, the base station transmits a sequence of 15 different S-SCH codes in a frame, in which each of the S-SCH codes is transmitted at the start of the respective slot in the frame. The sequence of S-SCH codes transmitted by the base station, and hence the boundary of the frame, may be determined using code searching, as discussed further below.

Figure 12:
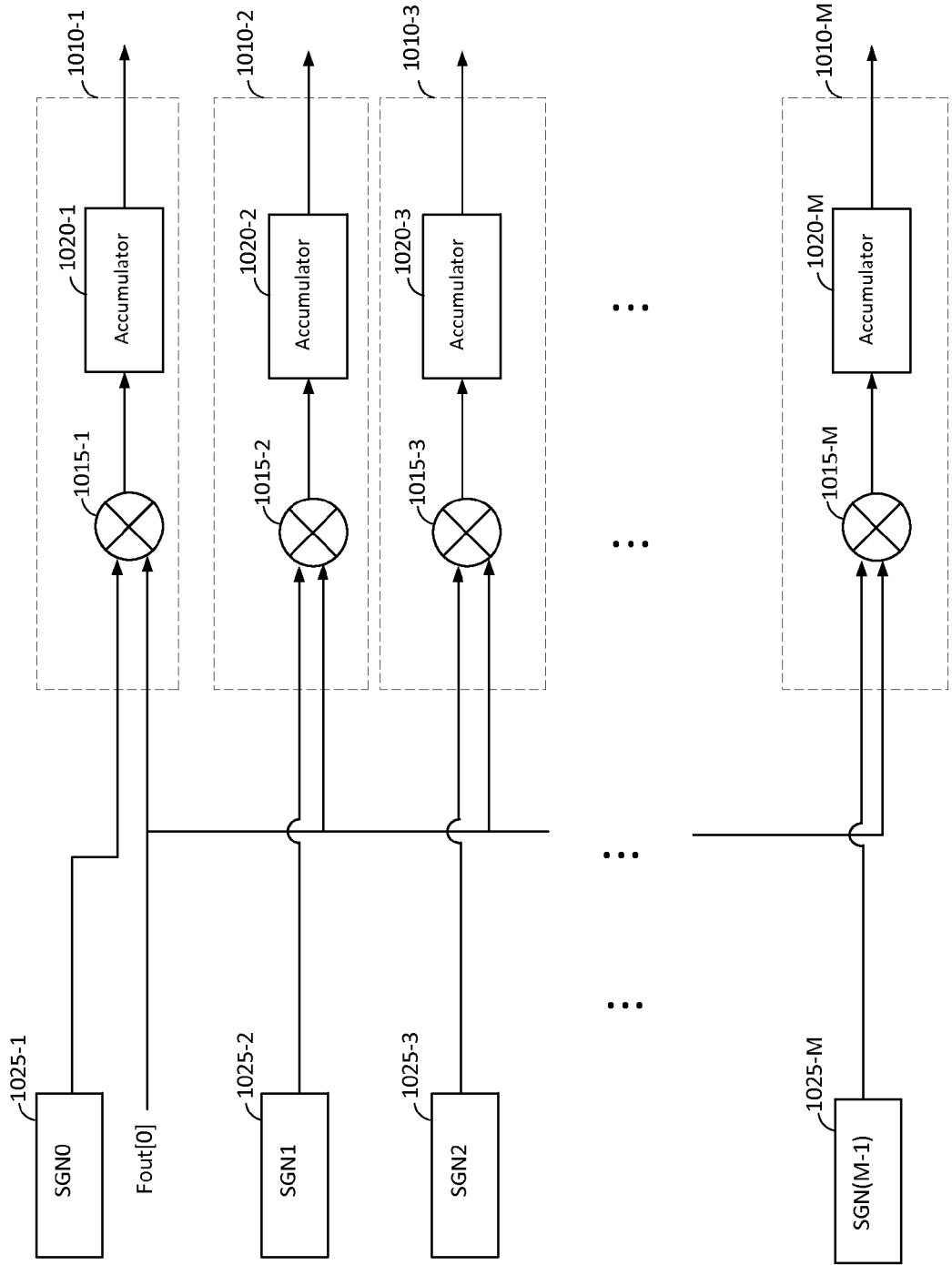
FIG. 12 shows a circuit for performing code searching according to an embodiment of the present disclosure.

FIG. 12 shows a code-searching circuit 1205 implemented in the vector execution unit 130 according to an embodiment of the present disclosure. As shown in FIG. 12, the code-searching circuit 1205 may reuse some or all of the despread blocks 1010-1 to 1010-M used in the time-searching circuit 1005. The code-searching circuit 1205 may also comprise a plurality of code generators 1025-1 to 1025-M, where each code generator 1025-1 to 1025-M generates a different code corresponding to a different code hypothesis, as discussed further below.

As discussed above, the base station may transmit a frame comprising 15 slots, in which a different S-SCH code is transmitted in each slot of the frame. In one aspect, the UE may know a priori a plurality of possible sequences of 15 S-SCH codes for a frame (e.g., 64 possible sequences of 15 S-SCH codes), and, for each sequence, know a priori the S-SCH code corresponding to the first slot in the frame. In this aspect, the code-searching circuit 1205 may be used to determine the S-SCH code in each of 15 consecutive slots. After the S-SCH code in each of the 15 slots is determined, the UE may determine which one of the possible sequences of S-SCH codes is being used for a frame. After the sequence of S-SCH codes is determined, the UE may determine the first slot of the frame (and hence the boundary of the frame) based on the S-SCH code in the sequence corresponding to the first slot of the frame.

Operations for determining the S-SCH code in one of the slots will now be described according to one embodiment of the present disclosure. The input samples to the code-searching circuit 1205 are fed to each one of the despread blocks 1010-1 to 1010-M. To determine the S-SCH code in the slot, each code generator 1025-1 to 1025-M generates a different one of the possible S-SCH codes for the slot (e.g., 16 possible S-SCH codes). The start of each generated S-SCH code may be time aligned with a slot boundary, as determined using the P-SCH code discussed above. Each generated S-SCH code is fed to a respective one of the despread blocks 1010-1 to 1010-M.

In each despread block 1010-1 to 1010-M, the respective multiplier 1015-1 to 1015-M despreads the input samples with the respective S-SCH code. The respective accumulator 1020-1 to 1020-M accumulates the output of the respective multiplier 1015-1 to 1015-M over the length of the S-SCH code (e.g., 256 chips) to generate one symbol. The respective accumulator 1020-1 to 1020-M starts accumulating at the start of the respective S-SCH code.

After one symbol period, the despread blocks 1010-1 to 1010-M output a plurality of symbols, where each symbol corresponds to a different one of the possible S-SCH codes, and therefore a different code hypothesis. The symbols may be stored in the vector register 120 for further processing. In one aspect, the UE may determine the energy level of each symbol, and determine the S-SCH code in the slot based on the S-SCH code corresponding to the symbol with the highest energy level.

The above operations may be repeated for each of the 15 slots to determine the S-SCH code in each of the 15 slots. As discussed above, after the S-SCH code in each of the 15 slots is determined, the UE may determine the sequence of S-SCH codes being used for a frame. After the sequence of S-SCH codes is determined, the UE may determine the first slot of the frame (and hence the boundary of the frame) based on the S-SCH code in the sequence corresponding to the first slot of the frame.

After acquiring slot and frame synchronization with the base station, the UE may identify a pilot code used by the base station. For example, the base station may transmit a pilot signal spread with one of a plurality of different Common Pilot Channel (CPICH) codes used by base stations in the CDMA system. The base station may repeatedly transmit the CPICH code. For example, the base station may transmit the CPICH code ten times in each slot, where the CPICH code comprises 256 chips and each slot spans 2560 chips.

In one aspect, the S-SCH code sequence used by the base station may correspond to a code group having eight possible CPICH codes. In this aspect, after determining the S-SCH code sequence being used by the base station, the UE may determine the code group for the base station based on the determined S-SCH code sequence. The UE may then reduce the number of possible CPICH codes being used by the base station to eight possible CPICH codes based on the code group. For example, there may be 64 code groups, in which each code group corresponds to eight CPICH codes taken from 512 possible CPICH codes.

Operations for identifying the pilot CPICH code for the base station using the code-searching circuit 1205 will now be described according to an embodiment of the present disclosure. The input samples to the code-searching circuit 1205 are fed to each one of the despread blocks 1010-1 to 1010-M. To determine the CPICH code, each code generator 1025-1 to 1025-M may generate a different one of the possible CPICH codes for the base station. As discussed above, the possible CPICH codes for the base station may be reduced to eight from 512 possible CPICH codes based on the code group for the base station. Each generated CPICH code may be time aligned in accordance with the slot timing provided by the P-SCH code discussed above. Each generated CPICH code is fed to a respective one of the despread blocks 1010-1 to 1010-M.

In each despread block 1010-1 to 1010-M, the respective multiplier 1015-1 to 1015-M despreads the input samples with the respective CPICH code. The respective accumulator 1020-1 to 1020-M accumulates the output of the respective multiplier 1015-1 to 1015-M over the length of the CPICH code (e.g., 256 chips) to generate one symbol. The respective accumulator 1020-1 to 1020-M may start accumulating at the start of the respective CPICH code.

After one symbol period, the despread blocks 1010-1 to 1010-M output a plurality of symbols, where each symbol corresponds to a different one of the possible CPICH codes, and therefore a different code hypothesis. The symbols may be stored in the vector register 120 for further processing. In one aspect, the UE may determine the energy level of each symbol, and identify the CPICH code for the base station based on the CPICH code corresponding to the symbol with the highest energy level. It is to be appreciated that the number of despread blocks 1010-1 to 1010-M used to perform code searching for the S-SCH and CPICH codes may be different.

Once the CPICH code for the base station is known, the UE may use the CPICH code to receive the pilot signal from the base station by despreading the pilot signal with the CPICH code. The UE may use the pilot signal to, e.g., perform timing and/or phase estimations for the base station. The UE may also use the pilot signal to measure the signal quality for the base station, where the signal quality may be expressed as received signal code power (RSCP), energy per chip over interference (Ec/Io), etc.

In one embodiment, the UE may use the CPICH code and the time-searching circuit 1005 to determine the arrival times of multipath signals from the base station for rake processing. Operations for determining the arrival times of multipath signals using the time-searching circuit 1005 will now be described.

Referring to FIG. 10, the code generator 1025 generates the CPICH code, which propagates down the plurality of delay elements 1030-1 to 1030-(M−1). The output of each delay element 1030-1 to 1030-(M−1) provides a different time-delayed version of the CPICH code, and therefore a different time-shifted version of the CPICH code. In one aspect, each delay element 1030-1 to 1030-(M−1) may have a time delay of one chip. In this aspect, the time-shifted versions of the CPICH code output by the delay elements 1030-1 to 1030-(M−1) are separated by one chip. Each time-shifted version of the CPICH code is fed to a respective one of the despread blocks 1010-1 to 1010-M, as shown in FIG. 10.

In each despread block 1010-1 to 1010-M, the respective multiplier 1015-1 to 1015-M despreads the samples input to the time-searching circuit 1005 with the respective time-shifted version of the CPICH code. The respective accumulator 1020-1 to 1020-M accumulates the output of the respective multiplier 1015-1 to 1015-M over the length of the CPICH code (e.g., 256 chips) to generate one symbol. The respective accumulator 1020-1 to 1020-M starts accumulating at the start of the respective time-shifted version of the CPICH code.

The despread blocks 1010-1 to 1010-M output M symbols, where each symbol corresponds to a different time-shifted version of the CPICH code, and therefore a different time hypothesis. The symbols may be stored in the vector register 120 for further processing. If more than M time hypotheses are desired, then the time-searching circuit 1005 may generate symbols corresponding to the desired number of time hypotheses over multiple iterations, in which the time-searching circuit 1005 generates M symbols corresponding to M time hypotheses in each iteration. For each iteration, the samples input to the time-searching circuit 1005 may be shifted by M chips with respect to the samples input to the time-searching circuit 1005 in the previous iteration.

The symbols corresponding to the different time hypotheses may be stored in the vector register 120 for further processing. In one aspect, the UE may determine the energy levels of the symbols, and look for one or more peaks in the energy levels of the symbols to determine the arrival times of multipath signals. For example, the UE may determine that the time hypothesis corresponding to the symbol with the highest energy level corresponds to the arrival time of the strongest one of the multipath signals (e.g., direct-path signal). The UE may also determine that the time hypotheses corresponding to the other peaks in the energy levels of the symbols correspond to the arrival times of the other multipath signals (e.g., reflected signals). After the arrival times of the multipath signals are determined, the UE may assign each multipath signal to a separate rake-finger operation.

For example, the vector execution unit 130 may comprise a plurality of rake-finger circuits, in which each rake-finger circuit is implemented using the rake-finger circuit 205 shown in FIG. 2 and each rake-finger circuit is assigned to one of the multipath signals. In this example, the timing of each rake-finger circuit is initialized according to the determined arrival time for the multipath signal assigned to the rake-finger circuit. In another example, the rake-finger circuit 205 may perform rake-finger processing for each of the multipath signals in a time division manner.

Figure 13:
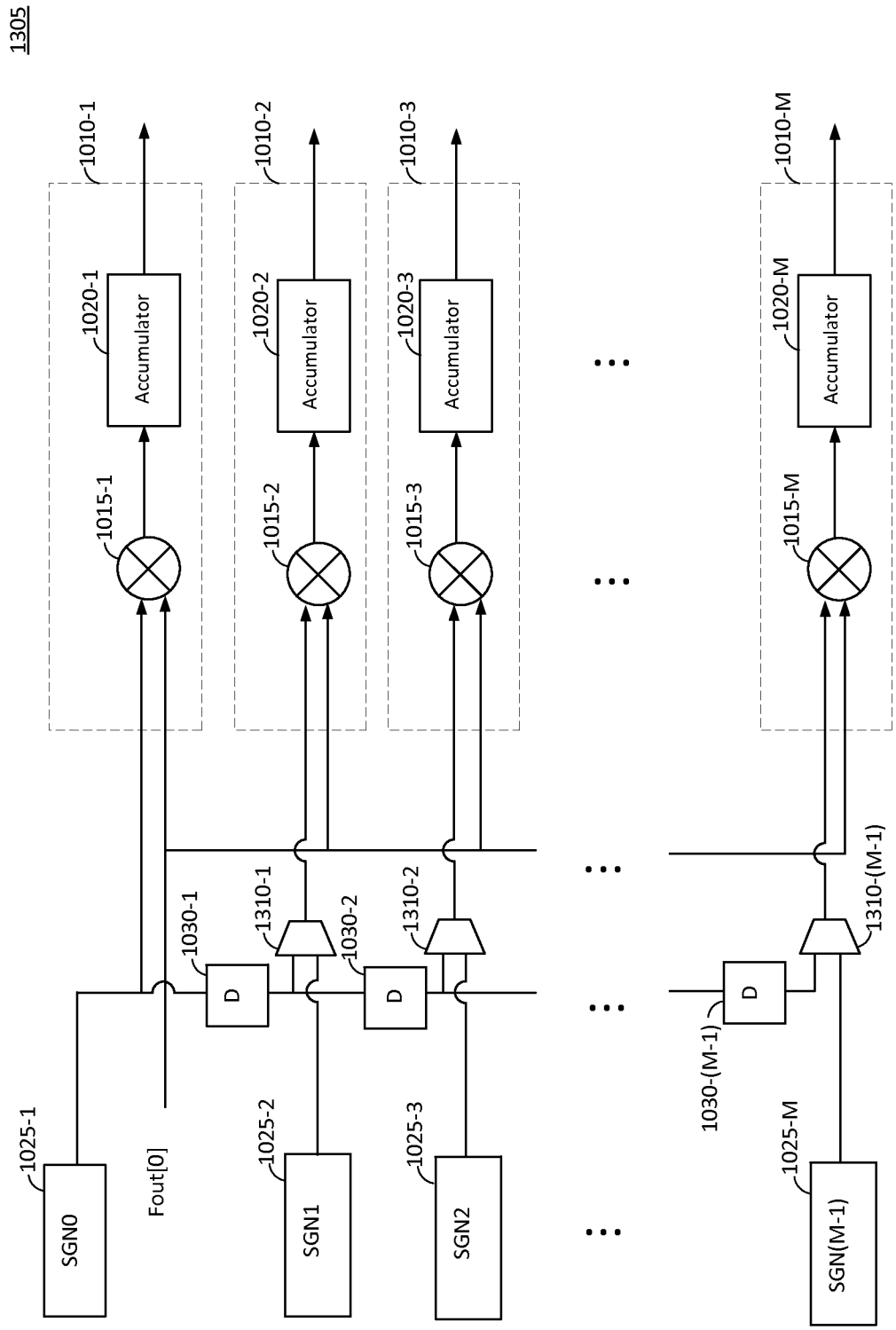
FIG. 13 shows a despread circuit that can be programmed to perform time searching and code searching according to an embodiment of the present disclosure.

In one embodiment, the vector execution unit 130 may be programmed to implement the time-searching circuit 1005 and the code-searching circuit 1205 (e.g., at different times) by reconfiguring the code paths to the multipliers 1015-1 to 1015-M of the despread blocks 1010-1 to 1010-M. In this regard, FIG. 13 shows an exemplary despread circuit 1305 that may be programmed to implement the time-searching circuit 1005 in a time-searching mode and the code-searching circuit 1205 in a code-searching mode. The despread circuit 1305 comprises a plurality of multiplexers 1310-1 to 1310-(M−1), where each multiplexer corresponds to one of the despread blocks 1010-1 to 1010-M. Each multiplexer 1310-1 to 1310-(M−1) is configured to selectively couple the multiplier 1015-1 to 1015-M in the respective despread block 1010-1 to 1010-M to either the corresponding delay output for time searching or the corresponding code generator 1025-1 to 1025-(M−1) for code searching.

When the despread circuit 1305 is programmed to implement the time-searching circuit 1005 in the time-searching mode, each multiplexer 1310-1 to 1310-(M−1) couples the multiplier 1015-1 to 1015-M in the respective despread block 1010-1 to 1010-M to the corresponding delay output shown in FIG. 10.

When the despread circuit 1305 is programmed to implement the code-searching circuit 1205 in the code-searching mode, each multiplexer 1310-1 to 1310-(M−1) couples the multiplier 1015-1 to 1015-M in the respective despread block 1010-1 to 1010-M to the corresponding code generator 1025-2 to 1025-(M−1) shown in FIG. 12. In this embodiment, the despread blocks 1010-1 to 1010-M may be reused for the timing-searching circuit 1005 and the code-searching circuit 1205, thereby making efficient reuse of components.

Thus, embodiments of the present disclosure allow the vector execution unit 130 to perform both time searching and code searching. In one aspect, the vector execution unit 130 may perform time searching to determine the timing of a P-SCH code transmitted by a base station. Since the P-SCH code is aligned with the start of a slot, the timing of the P-SCH code allows the UE to acquire slot synchronization with the base station. After slot synchronization, the vector execution unit 130 may perform code searching to determine a sequence of S-SCH codes transmitted by the base station. The determined sequence of S-SCH may be used to acquire frame synchronization with the base station and/or determine a code group used by the base station, as discussed above. The vector execution unit 130 may then perform code searching to determine a CPICH code used by the base station. The number of candidate CPICH codes used in the code search may be reduced (e.g., to eight candidate CPICH codes from 512 CPICH codes) based on the determined code group of the base station. The UE may then use the CPICH code to receive the pilot signal from the base station by despreading the pilot signal with the CPICH code. As discussed above, the pilot signal may be used to perform timing and/or phase estimations for the base station, measure the signal quality for the base station, etc.

It is to be appreciated that each code used to despread samples at the receiver (e.g., UE) may be a complex conjugate of a corresponding code used at the transmitter (e.g., a base station) to spread the corresponding signal. Further, it is to be appreciated that each sample and each symbol may be complex, and that each of the multipliers in the circuits discussed above may be a complex multiplier for performing complex multiplication.

As discussed above, the FIR filter circuit 220 determines sample values that are a fractional chip period offset from the sampling time of the ADC used to generate the samples input to the rake-finger circuit 205. In one aspect, the fractional chip period offset provided by the FIR filter circuit 220 may be tuned. For example, the FIR filter circuit 220 may be set to a plurality of different fractional chip period offsets, e.g., by adjusting the filter coefficients. The despread circuit 230 may be used to determine a symbol for each of the fractional chip period offsets. The FIR filter circuit 220 may then be tuned to the fractional chip period offset corresponding to the symbol resulting in the highest energy level.

Although embodiments of present disclosure are discussed above using the example of CDMA, it is to be appreciated that embodiments of the present disclosure are not limited to CDMA and may be used to perform time searching and/or code searching for other communication technologies including, e.g., time division multiple access (TDMA), frequency division multiple access (FDMA), orthogonal frequency-division multiple access (OFDMA), single carrier frequency division multiple access (SC-FDMA), etc.

Figure 14:
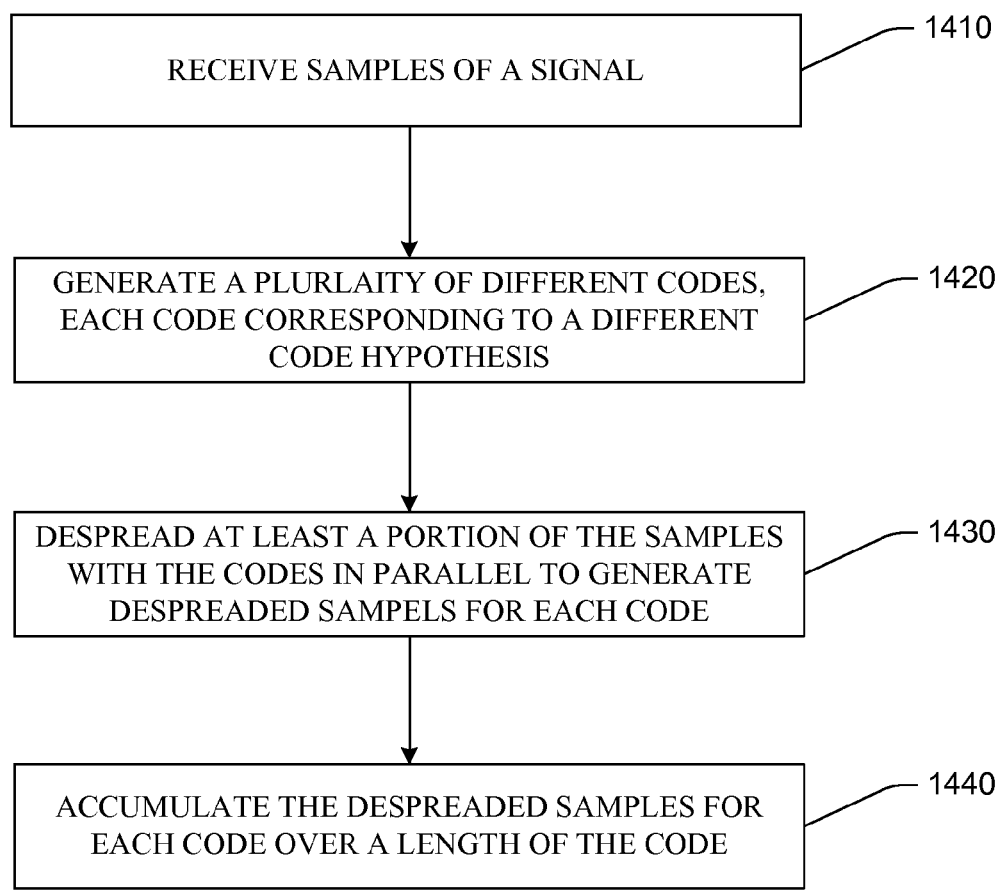
FIG. 14 is a flow diagram illustrating a method for signal searching according to an embodiment of the present disclosure.

FIG. 14 illustrates a method 1400 for signal searching according to an embodiment of the present disclosure.

In step 1410, samples of a signal are received. For example, the samples may be samples of a signal received at a UE from a base station.

In step 1420, a plurality of different codes are generated, each code corresponding to a different code hypothesis. For example, the plurality of different codes may be generated by a plurality of code generators (e.g., code generators 1025-1 to 1025-M). The codes may comprise different pilot codes (e.g., different CPICH codes).

In step 1430, at least a portion of the samples are despreaded with the codes in parallel to generate despreaded samples for each code. For example, the samples may be despread by a plurality of despread blocks (e.g., despread blocks 1010-1 to 1010-M) in parallel, where each despread block despreads the samples with a different one of the codes.

In step 1440, the despreaded samples for each code are accumulated over a length of the code. For example, the despreaded samples for each code may be accumulated over the length of the code (e.g., 256 chips) by a respective one of a plurality of accumulators (e.g., accumulators 1020-1 to 1020-M).

The method 1400 may optionally include receiving second samples. In one aspect, the second samples may comprise the same samples as the first samples received in step 1410. For example, the first and second samples may be provided by reading the same samples from the vector register 120 twice. In another aspect, the second samples may comprise some of the same samples as the first samples. For example, samples read from the vector register 120 to provide the first samples may overlap with samples read from the vector register 120 to provide the second samples. In a third aspect, the first and second samples may comprise completely different samples.

The method 1400 may also optionally comprise time shifting a code by different time delays to generate a plurality of time-shifted codes, each time-shifted code corresponding to a different time hypothesis. For example, the code may be time shifted by a plurality of delay elements coupled in series (e.g., delay elements 1030-1 to 1030-(M−1)) to generate the plurality of time-shifted codes.

The method 1400 may also optionally include despreading at least a portion of the second samples with the time-shifted codes in parallel to generate despreaded samples for each time-shifted code. For example, the samples may be despread by a plurality of despread blocks (e.g., despread blocks 1010-1 to 1010-M) in parallel, where each despread block despreads the samples with a different one of the time-shifted codes.

The method 1400 may further optionally include accumulating the despreaded samples for each time-shifted code over a length of the time-shifted code.

In one aspect, the steps of despreading at least a portion of the first samples with the generated codes in parallel and despreading at least a portion of the second samples with the time-shifted codes in parallel may both be performed using a same plurality of despread blocks (e.g., despread blocks 1010-1 to 101-M) at different times. In this aspect, the method 1400 may optionally include reconfiguring a plurality of code paths to the despread blocks from a first configuration to a second configuration, wherein in the first configuration, the code paths input the generated codes to the despread blocks, and in the second configuration, the code paths input the time-shifted codes to the despread blocks. For example, the code paths to the despread blocks may be reconfigured from the first configuration to the second configuration using a plurality of multiplexers (e.g., multiplexers 1310-1 to 1310-(M−1)). In the first configuration, the multiplexers may configure the code paths to couple the despread blocks to a plurality of code generators (e.g., code generators 1025-1 to 1025(M−1)), where the code generators generate the different codes. An example of the first configuration is shown in FIG. 12. In the second configuration, the multiplexers may configure the code paths to couple the despread blocks to a plurality of delay elements (e.g., delay elements 1030-1 to 1030-(M−1)), where the delay elements time shift the code to generate the time-shifted codes. An example of the second configuration is shown in FIG. 10.

In one aspect, the step of reconfiguring the code paths may be performed between the steps of despreading at least a portion of the first samples with the generated codes in parallel and despreading at least a portion of the second samples with the time-shifted codes in parallel. For example, the multiplexers may reconfigure the codes paths from the first configuration to the second configuration in response to an instruction (e.g., from the instruction dispatch circuit 140) to operate in the time-searching mode. The multiplexers may reconfigure the codes paths from the second configuration to the first configuration in response to an instruction (e.g., from the instruction dispatch circuit 140) to operate in the code-searching mode.

Those skilled in the art will appreciate that the various illustrative blocks, and steps described in connection with the disclosure herein may be implemented as electronic hardware, computer software, or combinations of both. To clearly illustrate this interchangeability of hardware and software, various illustrative components, blocks, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative blocks described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection may be properly termed a computer-readable medium to the extent involving non-transient storage of transmitted signals. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium, to the extent the signal is retained in the transmission chain on a storage medium or device memory for any non-transient length of time. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. A vector processor, comprising:
a plurality of code generators, wherein each code generator is configured to generate a different code corresponding to a different code hypothesis;
a plurality of delay elements coupled in series, wherein the delay elements are configured to shift a code by different time delays to generate a plurality of time-shifted codes, each time-shifted code corresponding to a different time hypothesis; and
a plurality of despread blocks configured to receive first samples and second samples of a signal;
wherein, in a time-searching mode, the plurality of despread blocks is configured to despread at least a portion of the first samples with each one of the time-shifted codes, and, in a code-searching mode, the plurality of despread blocks is configured to despread at least a portion of the second samples with each one of the different codes generated by the code generators.

2. The vector processor of claim 1, wherein each of the different codes generated by the code generators comprises a different pilot code.

3. The vector processor of claim 2, wherein each different pilot code comprises a different Common Pilot Channel (CPICH) code.

4. The vector processor of claim 1, wherein, in the time-searching mode, the code shifted by the different time delays comprises a synchronization signal.

5. The vector processor of claim 4, wherein the synchronization signal comprises a Primary Synchronization Channel (P-SCH) code.

6. The vector processor of claim 2, wherein each delay element has a time delay approximately equal to one chip.

7. The vector processor of claim 2, further comprising:
a plurality of multiplexers, wherein each multiplexer is coupled to a respective one of the despread blocks, and each multiplexer is configured to couple the respective despread block to one of the code generators in the code-searching mode, and to couple the respective despread block to one of the delay elements in the time-searching mode.

8. The vector processor of claim 7, wherein the multiplexers are configured to receive a first instruction to operate in the code-searching mode, to couple the despread blocks to the respective code generators in response to the first instruction, to receive a second instruction to operate in the time-searching mode, and to couple the despread blocks to the respective delay elements in response to the second instruction.

9. A method of signal searching, comprising:
receiving first samples and second samples of a signal;
generating a plurality of different codes, each different code corresponding to a different code hypothesis;
despreading at least a portion of the first samples with the generated different codes in parallel to generate despreaded samples for each different code;
accumulating the despreaded samples for each different code over a length of the different code;
time shifting a code by different time delays to generate a plurality of time-shifted codes, each time-shifted code corresponding to a different time hypothesis;
despreading at least a portion of the second samples with the time-shifted codes in parallel to generate despreaded samples for each time-shifted code; and
accumulating the despreaded samples for each time-shifted code over a length of the time-shifted code;
wherein despreading at least a portion of the first samples with the generated different codes in parallel and despreading at least a portion of the second samples with time-shifted codes in parallel are performed using a same plurality of despreaded blocks at different times.

10. The method of claim 9, wherein each of the generated different codes comprises a different pilot code.

11. The method of claim 10, wherein each different pilot code comprises a different Common Pilot Channel (CPICH) code.

12. The method of claim 9, wherein the code being time shifted comprises a synchronization signal.

13. The method of claim 12, wherein the synchronization signal comprises a Primary Synchronization Channel (P-SCH) code.

14. The method of claim 9, further comprising reconfiguring a plurality of code paths to the despread blocks from a first configuration to a second configuration, wherein in the first configuration, the code paths input the generated different codes to the despread blocks, and in the second configuration, the code paths input the time-shifted codes to the despread blocks.

15. The method of claim 14, wherein reconfiguring the code paths is performed between the steps of despreading at least a portion of the first samples with the generated different codes in parallel and despreading at least a portion of the second samples with the time-shifted codes in parallel.

16. An apparatus for signal searching, comprising:
means for receiving first samples and second samples of a signal;
means for generating a plurality of different codes, each different code corresponding to a different code hypothesis;

means for despreading at least a portion of the first samples with the generated different codes in parallel to generate despreaded samples for each different code;

means for accumulating the despreaded samples for each different code over a length of the different code;

means for time shifting a code by different time delays to generate a plurality of time-shifted codes, each time-shifted code corresponding to a different time hypothesis;

means for despreading at least a portion of the second samples with the time-shifted codes in parallel to generate despreaded samples for each time-shifted code; and means for accumulating the despreaded samples for each time-shifted code over a length of the time-shifted code;

wherein the means for despreading at least a portion of the first samples with the generated different codes in parallel and means for despreading at least a portion of the second samples with time-shifted codes share a plurality of code inputs.

17. The apparatus of claim 16, wherein each of the generated different codes comprises a different pilot code.

18. The apparatus of claim 17, wherein each different pilot code comprises a different Common Pilot Channel (CPICH) code.

19. The apparatus of claim 16, wherein the code being time shifted comprises a synchronization signal.

20. The apparatus of claim 19, wherein the synchronization signal comprises a Primary Synchronization Channel (P-SCH) code.

21. The apparatus of claim 16, further comprising means for reconfiguring a plurality of code paths to the plurality of code inputs from a first configuration to a second configuration, wherein in the first configuration, the code paths input the generated different codes to the code inputs, and in the second configuration, the code paths input the time-shifted codes to the code inputs.

22. The apparatus of claim 21, further comprising means for receiving an instruction to operate the apparatus in a time-searching mode, wherein the means for reconfiguring reconfigures the code paths from the first configuration to the second configuration in response to the instruction.

* * * * *